US011679699B2

(12) United States Patent
Haller et al.

(10) Patent No.: US 11,679,699 B2
(45) Date of Patent: Jun. 20, 2023

(54) VEHICLE SEAT HAVING A BACKREST

(71) Applicant: GRAMMER AG, Ursensollen (DE)

(72) Inventors: Erwin Haller, Birgland (DE); Konstantin Krivenkov, Amberg (DE)

(73) Assignee: GRAMMER AG, Ursensollen (DE)

(*) Notice: Subject to any disclaimer, the term of this patent is extended or adjusted under 35 U.S.C. 154(b) by 0 days.

(21) Appl. No.: 17/544,360

(22) Filed: Dec. 7, 2021

(65) Prior Publication Data
US 2022/0194269 A1 Jun. 23, 2022

(30) Foreign Application Priority Data

Dec. 18, 2020 (DE) .................... 102020134209.8

(51) Int. Cl.
*B60N 2/22* (2006.01)
*B60N 2/90* (2018.01)
*B60N 2/64* (2006.01)
*B60N 2/28* (2006.01)
*B60N 2/885* (2018.01)

(52) U.S. Cl.
CPC ............ *B60N 2/2222* (2013.01); *B60N 2/99* (2018.02); *B60N 2/2872* (2013.01); *B60N 2/643* (2013.01); *B60N 2/885* (2018.02)

(58) Field of Classification Search
CPC ........ B60N 2/2872; B60N 2/885; B60N 2/99; B60N 2/643; B60N 2/2222
See application file for complete search history.

(56) References Cited

U.S. PATENT DOCUMENTS

| 7,364,239 B2* | 4/2008 | Clough ................. B60N 2/885 297/391 |
| 9,718,384 B2* | 8/2017 | Haller .................... B60N 2/643 |
| 2022/0194268 A1 | 6/2022 | Haller | |

FOREIGN PATENT DOCUMENTS

EP 2719575 4/2014

OTHER PUBLICATIONS

Extended Search Report for European Patent Application No. 21210534.0, dated Apr. 14, 2022, 5 pages.

* cited by examiner

*Primary Examiner* — Syed A Islam
(74) *Attorney, Agent, or Firm* — Sheridan Ross P.C.

(57) ABSTRACT

The invention relates to a vehicle seat having a backrest which comprises a backrest part and a backrest base element, the backrest part comprising a middle backrest element which is arranged pivotably on the backrest base element, wherein the backrest part comprises two lower backrest side elements and two upper backrest side elements, which are each mechanically coupled to the middle backrest element, wherein the two lower backrest side elements are arranged pivotably on the backrest base element, wherein at least one joint device is provided in each case between a lower backrest side element and an upper backrest side element, wherein a lower backrest side element and an upper backrest side element are each arranged at an angle $\alpha_L$, $\alpha_R$ to one another, wherein pivoting of the middle backrest element causes a change in the angle $\alpha_L$, $\alpha_R$, wherein the joint device comprises at least one first elastic element.

15 Claims, 30 Drawing Sheets

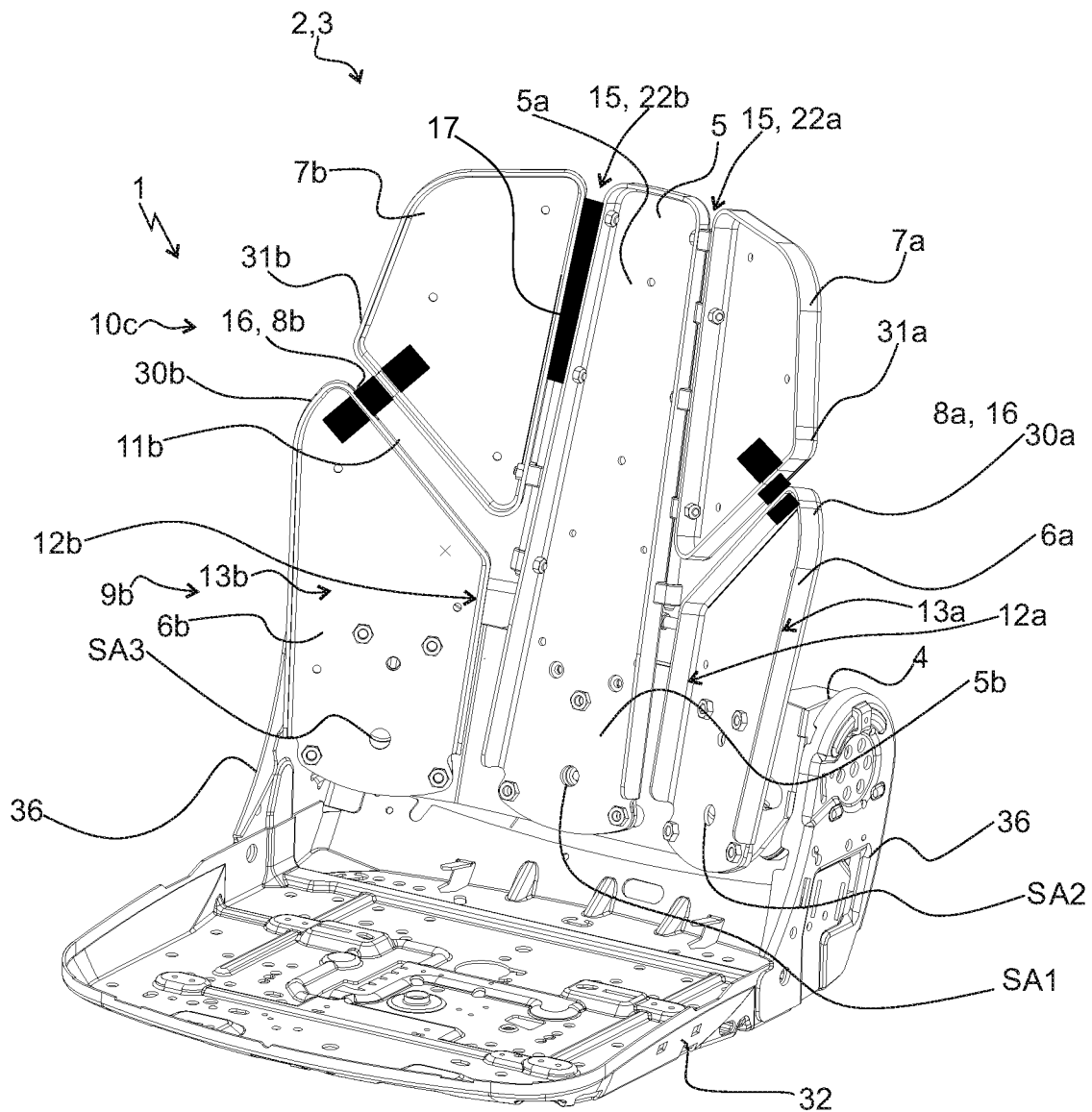
Fig. 2a
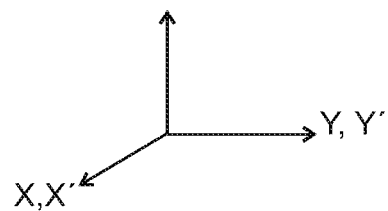

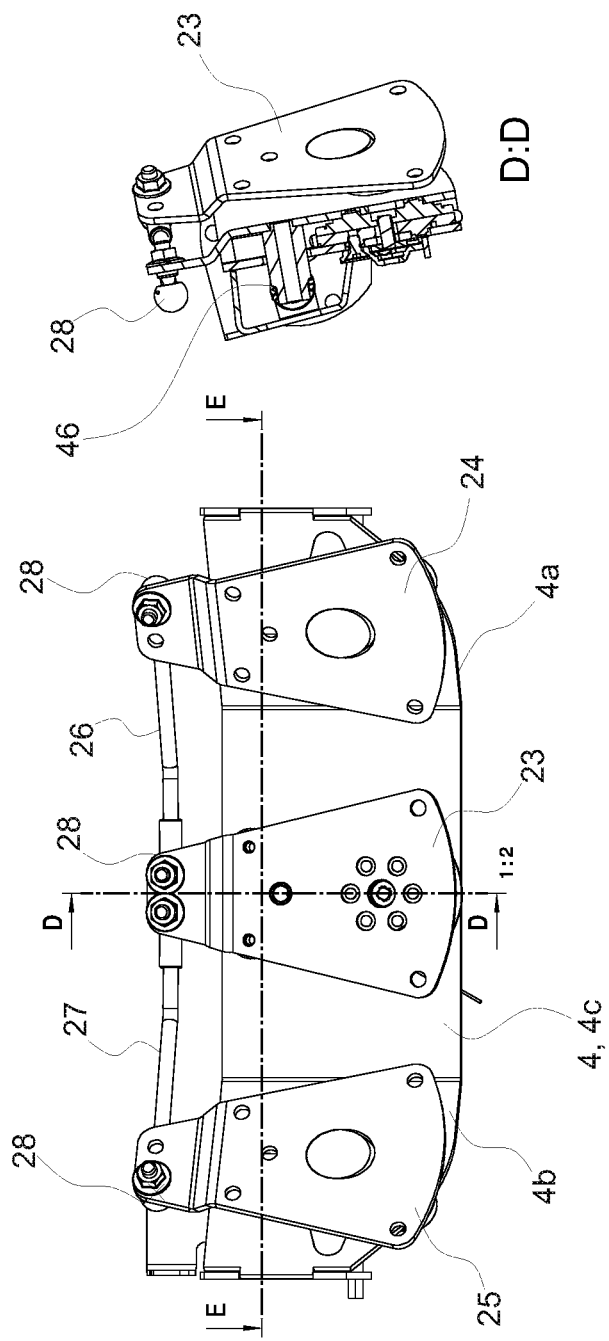
Fig. 10c
Fig. 10a
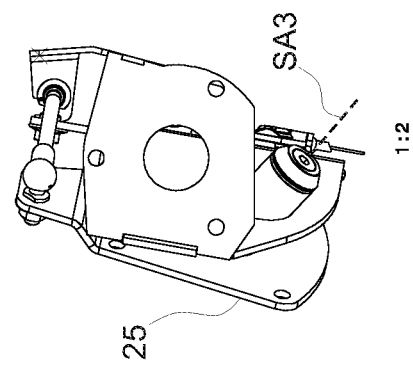
Fig. 10b

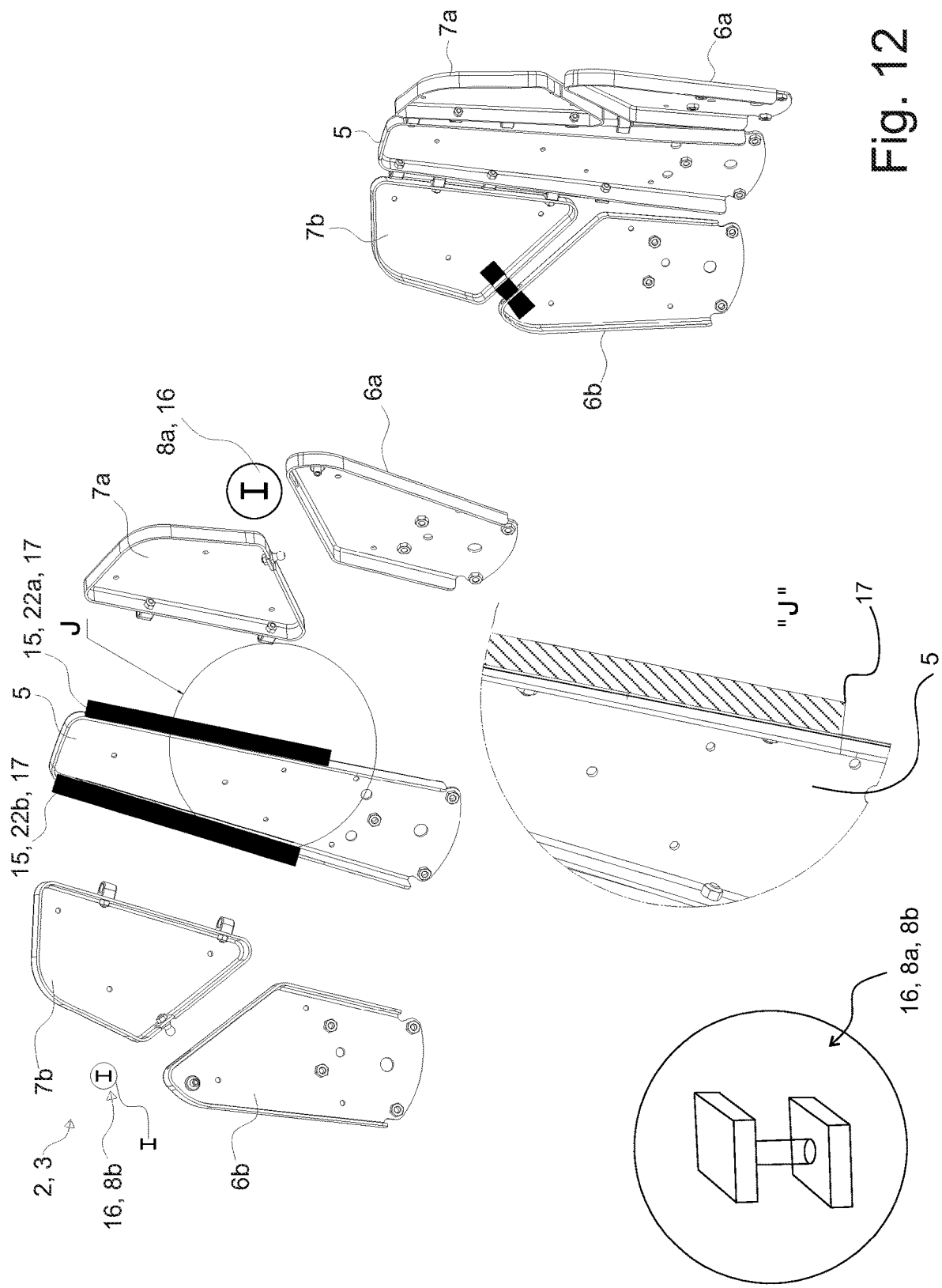

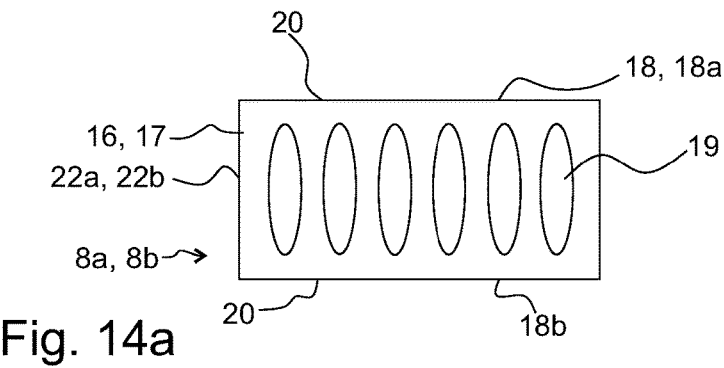
Fig. 14a
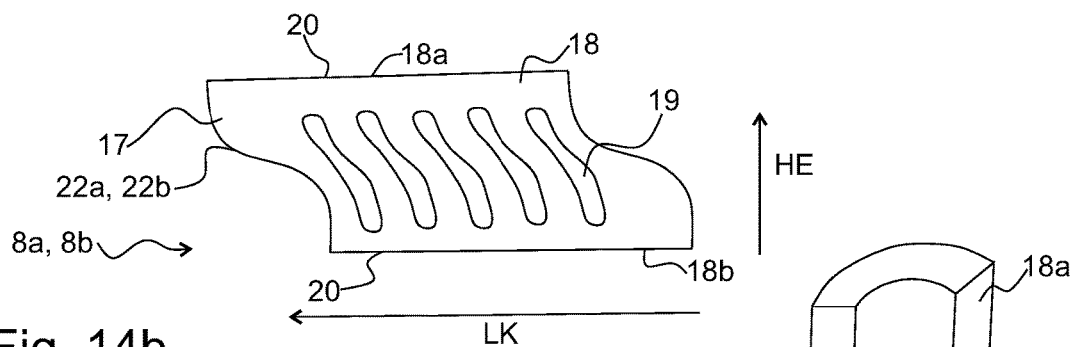
Fig. 14b
Fig. 14c
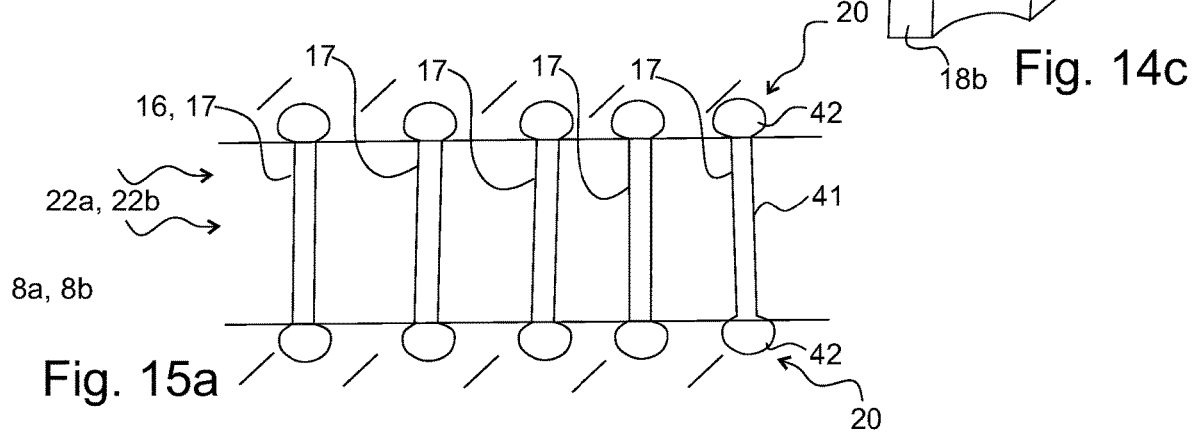
Fig. 15a
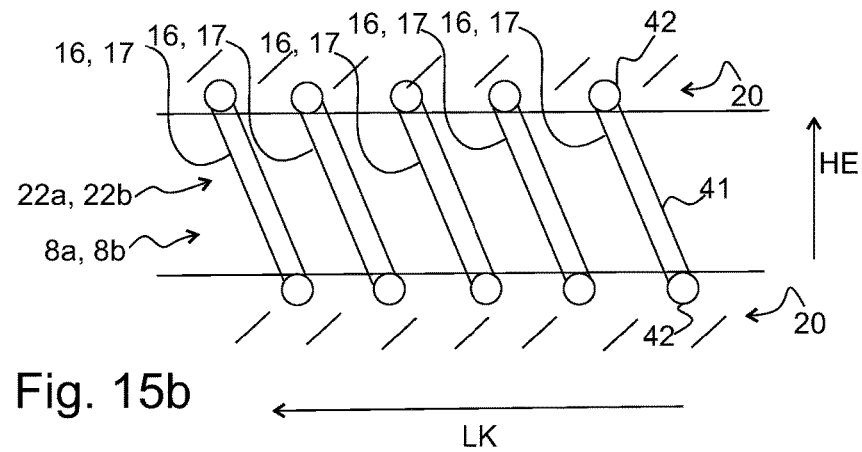
Fig. 15b

VEHICLE SEAT HAVING A BACKREST

CROSS-REFERENCE TO RELATED APPLICATION

This application claims the benefit of German Patent Application No. 10 2020 134 209.8 filed Dec. 18, 2020, the contents of which are incorporated herein by reference in its entirety.

FIELD

The invention relates to a vehicle seat having a backrest which comprises a backrest base element and a backrest part, the backrest part comprising a middle backrest element which is arranged pivotably on a backrest base element.

BACKGROUND

When commercial vehicles, such as tractors, forklift trucks, etc., are used it is often necessary for the driver to look to the rear or to the side, as reversing is necessary or components attached or coupled to the rear or side of the vehicle must be monitored or checked. If necessary, actuators arranged at the side or at the rear can also be operated. The driver or occupant must turn his upper body accordingly. In this turning movement, however, conventional vehicle seats do not provide the occupant with appropriate support. Due to the lack of support, the driver tires more quickly and the seating comfort is considerably reduced.

SUMMARY

The object of the present invention is to provide a vehicle seat which solves the aforementioned problems.

The object is achieved by the subject matter of independent claim 1. Advantageous embodiments can be found in the dependent claims.

The core concept of the invention is a vehicle seat having a backrest which comprises a backrest part and a backrest base element, the backrest part comprising a middle backrest element which is arranged pivotably on the backrest base element, wherein the backrest part comprises two lower backrest side elements and two upper backrest side elements, which are each mechanically coupled to the middle backrest element, wherein the two lower backrest side elements are arranged pivotably on the backrest base element, wherein at least one joint device is provided between a lower backrest side element and an upper backrest side element, wherein a lower backrest side element and an upper backrest side element are each arranged at an angle ($\alpha_L$, $\alpha_R$) to one another, wherein pivoting of the middle backrest element causes a change in the angle ($\alpha_L$, $\alpha_R$), wherein the joint device comprises or is at least one first elastic element.

Accordingly, the vehicle seat according to the invention comprises an at least five-part backrest part which serves to support the occupant. The middle backrest element, the two lower backrest side elements and the two upper backrest side elements are also referred to below as the backrest elements. The mechanical couplings and the articulation of an upper backrest side element on an associated lower backrest side element bring about an ergonomically optimal adaptation of the backrest part to a turning movement of an occupant. Furthermore, such a pivotable backrest part can also serve to isolate transverse accelerations (swaying). By designing the joint device in such a way that it comprises at least one elastic element, the vehicle seat is of simple design and can be manufactured inexpensively.

The backrest extends along a height axis Z, a width axis Y and a longitudinal axis X. The vehicle seat extends along a height axis Z', a width axis Y' and a longitudinal axis X'.

A lower backrest side element and an upper backrest side element are preferably arranged on the left side of the middle backrest element and form a left side portion of the backrest part. A further lower backrest side element and a further upper backrest side element are advantageously arranged on the right side of the middle backrest element and form a right side portion of the backrest part.

In a initial position of the backrest or the vehicle seat, the middle backrest element is preferably arranged substantially in a first plane E1, which is spanned by a height axis Z of the backrest and a width axis Y of the backrest. Advantageously, in the initial position of the backrest, the left side portion of the backrest part is arranged substantially in a second side plane E2, which is spanned by the height axis Z of the backrest and a first axis A1. In the initial position of the backrest, the right side portion of the backrest part is advantageously arranged substantially in a third side plane E3, which is spanned by the height axis Z of the backrest and a second axis A2. The width axis Y and the first axis A1 preferably enclose an angle of inclination $\beta_1$. The width axis Y and the second axis A2 preferably enclose an angle of inclination $\beta_2$. The angles of inclination $\beta_1$, $\beta_2$ are preferably in a range between 5° and 80°, more preferably in a range between 20° and 70°, more preferably in a range between 30° and 50°. The first angle of inclination $\beta_1$ is advantageously equal to the second angle of inclination $\beta_2$. This forwardly inclined arrangement of the side portions provides support for the occupant in the lateral directions. The backrest thus advantageously has a type of shell shape which gives the occupant a certain amount of support with respect to forces acting in the width direction.

The upper backrest side elements are preferably arranged along the height axis above the lower backrest side elements. According to a preferred embodiment, at least in the initial position of the backrest, the upper backrest side elements and the lower backrest side elements are spaced apart from one another. Advantageously, at least in the initial position of the backrest, a slot is formed between the upper backrest side elements and the lower backrest side elements. Advantageously, starting from an inner region of a side portion of the backrest part, the slot runs obliquely upwards along the height axis to an outer region of a side portion of the backrest part. The inner region of the side portion is arranged closer to the middle backrest element along the width direction Y than the outer region of the side portion. The two slots have the advantage of, on the one hand, allowing ventilation of the occupant's back, and on the other hand, facilitating an advantageous relative movement of the upper and lower backrest side elements with respect to one another.

A first coupling mechanism is preferably provided, by means of which the middle backrest element is mechanically coupled to the two lower backrest side elements. A second coupling mechanism is advantageously provided, by means of which the middle backrest element is mechanically coupled to the two upper backrest side elements. In a preferred initial position of the vehicle seat or the backrest, the occupant is facing forwards. In this advantageous initial position, the middle backrest element extends substantially along the height axis Z and thus serves as a support for the spinal column region or a part of the spinal column region of the occupant. Advantageously, a turning movement of an occupant results in an introduction of force into the backrest part. This introduction of force acts, depending on the seated posture of the occupant, on one, several or all of the at least five backrest elements. Advantageously, due to the advantageous mechanical coupling of the upper and lower backrest side elements to the middle backrest element, the introduction of force acts on all the backrest elements. The introduction of force preferably causes the middle backrest element and the two lower backrest side elements to pivot relative to the backrest base element. The middle backrest element is preferably pivoted in directions parallel to the width axis Y. The first coupling mechanism and the second coupling mechanism advantageously form a forced control.

According to a further advantageous embodiment, a joint device is provided in each of the outer regions of the left side portion and the right side portion of the backrest part. The at least one joint device is advantageously arranged at least in portions in the associated slot. In the initial position of the backrest, a distance between a lower backrest side element and a correspondingly associated upper backrest side element in the slot is preferably substantially constant along its entire length. Advantageously, when the middle backrest element is pivoted along a direction parallel to the width axis, a distance between a lower backrest side element and an upper backrest side element changes at least in the inner region of a side portion of the backrest part due to the mechanical couplings and a deflection of the joint device. Preferably, the distance between a lower backrest side element and a correspondingly associated upper backrest side element becomes smaller when pivoting in the direction of the associated side portion.

According to a further advantageous embodiment, the at least one first elastic element of the joint device is fastened directly or indirectly to one of the lower backrest side elements and to an upper backrest side element. The at least one first elastic element has a vertical extent HE. When the backrest side elements move relative to one another, the at least one first elastic element is rotated about its vertical extent HE and is further expanded or compressed. The expansion or compression can be, for example, uniform, a shear or some other deformation along a longitudinal axis LE. The joint device can advantageously also comprise a plurality of first elastic elements which are arranged along a longitudinal extent of the slot. The first elastic elements can preferably be arranged over the entire longitudinal extent of the slot, or only along a portion of the longitudinal extent of the slot. It would also be conceivable for the joint device to be designed as a single first elastic element. This one first elastic element can likewise preferably be arranged over the entire longitudinal extent of the slot or only along a portion of the longitudinal extent of the slot. The joint device advantageously comprises at least one fastening element which is made of a dimensionally stable plastics material. The at least one first elastic element is advantageously arranged on the at least one fastening element. Two plate-like fastening elements are preferably provided, between which the at least one first elastic element or the plurality of first elastic elements are arranged. The fastening elements serve to fasten the joint device to one of the upper backrest side elements and the corresponding lower backrest side element. An injection-moulding process is preferably used to produce the fastening elements and the elastic elements. The first elastic elements are advantageously injected into the fastening elements. It would also be conceivable for at least one undercut, preferably a plurality of undercuts, to be provided on the upper and lower backrest side elements and for the first elastic element to be moulded directly onto this backrest element. The advantageous provision of the undercuts can ensure that this connection has a sufficient mechanical load-bearing capacity.

According to a further advantageous embodiment, the second coupling mechanism comprises coupling devices, by means of which in each case an upper backrest side element is arranged on the middle backrest element. Accordingly, the left upper backrest side element is preferably arranged with a left coupling device on a left side region of the middle backrest element. Accordingly, the right upper backrest side element is preferably arranged with a right coupling device on a right side region of the middle backrest element. The coupling device advantageously comprises at least one second elastic element which is arranged between an upper backrest side element and the middle backrest element. The coupling device can advantageously also comprise a plurality of second elastic elements which extend along a longitudinal extent of the upper backrest side element and/or of the middle backrest element. The second elastic elements can preferably be arranged over the entire longitudinal extent of the upper backrest side element and/or of the middle backrest element or only along a portion of the longitudinal extent of the upper backrest side element and/or of the middle backrest element. It would also be conceivable for a coupling device to be designed as a single second elastic element. This one second elastic element can also preferably be arranged over the entire longitudinal extent of the upper backrest side element and/or of the middle backrest element, or only along a portion of the longitudinal extent of the upper backrest side element and/or of the middle backrest element.

The coupling device advantageously allows a translational movement of the upper backrest side element relative to the middle backrest element along a longitudinal axis LA of the middle backrest element. The coupling device preferably allows a rotary movement of the upper backrest side element relative to the middle backrest element about an axis of rotation DA which runs parallel to the longitudinal axis LA of the middle backrest element. When the middle backrest element is pivoted, there is advantageously both a translational movement of the upper backrest side element relative to the middle backrest element and a rotary movement of the upper backrest side element relative to the middle backrest element. During this movement, the at least one second elastic element is rotated about the axis of rotation DA and is expanded or compressed along the longitudinal axis LA or the longitudinal axis of the elastic element LE. The expansion or compression can be, for example, uniform, a shear or some other deformation along the longitudinal axis LE. The at least one second elastic element is preferably made of an elastomer. The coupling device advantageously comprises at least one fastening element which is made of a dimensionally stable plastics material. The at least one second elastic element is advantageously arranged on the at least one fastening element. Preferably, two plate-like fastening elements are provided, between which the at least one second elastic element or the plurality of second elastic elements are arranged. The fastening elements serve to fasten the coupling device to one of the upper backrest side elements and the middle backrest element. An injection-moulding process is preferably used to produce fastening elements and the second elastic elements. The second elastic elements are advantageously injected into the fastening elements. It would also be conceivable for at least one undercut, preferably a plurality of undercuts, to be provided on the upper backrest side elements and on the middle backrest element, and for the second elastic element to be moulded directly onto this backrest element. The advantageous provision of the undercuts can ensure that this connection has a sufficient mechanical load-bearing capacity.

According to a further advantageous embodiment, the backrest base element has a middle region which extends substantially parallel to the first plane E1. It is also advantageous that the backrest base element has two side regions, which are advantageously rigidly connected to the middle region. The backrest base element is preferably designed integrally or in one piece. A left side region of the backrest base element preferably extends substantially parallel to the second side plane E2. A right side region of the backrest base element preferably extends substantially parallel to the third side plane E3. Such an angled design of the backrest base element preferably predetermines the design of the backrest part in the initial position of the backrest.

According to a further advantageous embodiment, the middle backrest element is arranged on the middle region of the backrest base element so as to be pivotable about a first pivot axis. The first pivot axis can advantageously be a real or an imaginary pivot axis which extends parallel to the longitudinal axis X of the backrest. The middle backrest element is preferably mounted on the backrest base element by means of a first pivot axis SA1. A first fastening element is preferably provided, which is firmly connected to the middle backrest element and which is pivotable about the first pivot axis SA1. By the use of a stable fastening element, the lower backrest side element can be constructed more easily.

According to a particularly preferred embodiment, the lower backrest side elements are each arranged on the side regions of the backrest base element so as to be pivotable about a second or third pivot axis. The second pivot axis and/or the third pivot axis can advantageously be a real or an imaginary pivot axis. The second and third pivot axes SA2, SA3 preferably extend obliquely upwards along the longitudinal axis X and the height axis Z. The second and/or the third pivot axis extend obliquely upwards, starting from a rear region of the backrest, which faces away from the occupant, to the respective lower backrest side elements or the respective fastening elements. The second and/or the third pivot axis SA2, SA3 thus preferably enclose an angle $\gamma_2$, $\gamma_3$ with a plane which is spanned by the longitudinal axis X and the width axis Y. These angles $\gamma_2$, $\gamma_3$ are preferably in a range between 10° and 80°, more preferably in a range between 20° and 70°, more preferably in a range between 30° and 60°. A second fastening element is preferably provided which is firmly connected to the lower backrest side element arranged on the left and which is pivotable about the second pivot axis. A third fastening element is preferably provided which is firmly connected to the backrest side element arranged on the right and which is pivotable about the third pivot axis. Due to the course of the second and third pivot axis obliquely upwards and forwards, when the lower backrest side elements are pivoted, the advantageous effect occurs that an upper edge region along the height axis Z and simultaneously an outer edge region of the lower backrest side elements along the width axis Y moves forwards or backwards along the longitudinal axis. Thus, when this region pivots to a certain side, it moves forwards and when it pivots in the opposite direction it moves backwards.

According to a further preferred embodiment, the first coupling mechanism transmits a pivoting movement of the middle backrest element to the left lower backrest side element and/or to the right lower backrest side element and vice versa. The first coupling mechanism preferably transmits a pivoting movement of the first fastening element to the second fastening element and to the third fastening element. The first coupling mechanism preferably transmits a pivoting movement of the second fastening element and/or of the third fastening element to the first fastening element. The first coupling mechanism advantageously has a first coupling rod which connects the first fastening element and the second fastening element. The first coupling mechanism preferably has a second coupling rod which connects the first fastening element and the third fastening element. The coupling rods are preferably each fastened to the fastening elements by means of a ball joint. However, the invention is not limited to this embodiment. Of course, other couplings which can transmit the pivoting movements correspondingly can also be considered. Such coupling mechanisms could be, for example, gears, Bowden cables or the like.

According to a further preferred embodiment, the upper backrest side elements and the lower backrest side elements are designed as plate-like elements. The plate-like elements are advantageously designed to accommodate upholstery elements. However, it would also be conceivable that no further upholstery elements are provided or that only one upholstery layer is applied to the plate-like elements. The advantageous upholstery elements and/or the plate-like elements form a corresponding bearing or support surface for the occupant. This bearing surface is preferably at least divided into two by the slot.

When the middle backrest element is pivoted towards a side portion of the backrest part, the angle ($\alpha_L$, $\alpha_R$) is advantageously an obtuse angle. When the middle backrest element is pivoted towards a side portion of the backrest part, an upper edge region of the lower backrest side element and a lower edge region of the upper backrest side element are preferably displaced forwards at least in an outer edge region of the side portion along the longitudinal axis X. This region which is moved forwards is perceived as a kind of bulge towards the front of the bearing surface. When the upper body turns while sitting, the side rear region of the upper body bends a little. This region is supported by the described bulge of the bearing surface, which provides an ergonomically comfortable vehicle seat.

According to a further advantageous embodiment, a third elastic element is provided which comprises the two first elastic elements and the two second elastic elements and also connects the lower backrest side elements and the middle backrest element. The third elastic element is thus arranged in each case between an upper and a lower backrest side element, between an upper backrest side element and the middle backrest element and between a lower backrest side element and the middle backrest element. The particular distance between the backrest elements is preferably at least partially or substantially completely filled by the third elastic element. The third elastic element is advantageously made of an elastic plastics material and/or an elastomer which is injected into the relevant space between the backrest elements. For this purpose, the at least five backrest elements are advantageously placed into an injection mould. An elastic plastics material can then be injected into the gaps or spaces between the backrest elements. Advantageously, a thickness of the third elastic element in the portions of the first and second elastic elements, i.e. between the upper and lower backrest side elements and between the upper backrest side elements and the middle backrest element, is greater than in the portions of the third elastic element which are located between the lower backrest side elements and the middle backrest element. This is advantageous because greater forces act on the third elastic element in the regions of the first and second elastic elements. Undercuts are advantageously provided on the backrest elements in order to ensure sufficient mechanical load-bearing capacity between the backrest elements and the third elastic element.

According to a further preferred embodiment, the middle backrest element is designed in two parts. The two portions of the middle backrest element are preferably connected to one another by a further joint device. The joint device is preferably arranged in a lower region of the middle backrest element. The further joint device is advantageously arranged in or above the occupant's lumbar region. An upper portion of the middle backrest element is advantageously pivotable relative to the lower portion along the longitudinal axis X. A posture adjustment or lordosis/kyphosis of the occupant can be compensated for by such pivoting. Advantageously, the inclination of the upper portion of the middle backrest element can be adjusted hydraulically, pneumatically or also manually by an actuating drive, for example an electric motor.

According to a further preferred embodiment, the backrest base element is arranged on a seat base element so as to be rotatable about an axis of inclination. In this way the inclination of the backrest can be modified. This inclination can of course be adjusted by a motor, mechanically or in some other way. Furthermore, a locking device can be provided, by means of which this inclination can be locked.

According to a further preferred embodiment, a locking device is provided, by means of which the rotational position of the backrest part can be locked. A rotational position is defined by the pivoting of a middle backrest element, the pivoting of the lower backrest side elements and the relative changes in the orientations or the positions of the backrest elements with respect to one another. The initial position of the backrest is of course also to be understood as such a rotational position. The locking device can be designed, for example, in such a way that the pivoting of the middle backrest element is locked. Due to the mechanical coupling of the backrest elements, the further backrest elements are also fixed in their position or orientation by such a locking mechanism. The locking device can be operated via an operating device. The operating device can comprise a mechanical system, for example a Bowden cable system, or an electrical system, for example an electric actuating drive.

A resetting device is advantageously provided, by means of which the backrest part can be returned to the initial position. The resetting device can be a mechanical device, for example a spring arrangement, an electric actuating drive or a hydraulic or pneumatic device.

According to a further preferred embodiment, a drive unit is provided by means of which the backrest part can be brought into a rotational position. The drive unit can be designed, for example, in such a way that the pivoting of the middle backrest element is driven. As a result of the mechanical coupling of the backrest elements, such a drive also brings the further backrest elements into a corresponding position or orientation. Such a drive unit can be, for example, an actuating drive, preferably with an electric motor, or a hydraulic or pneumatic drive.

BRIEF DESCRIPTION OF THE DRAWINGS

Further advantages, aims and characteristics of the present invention are explained with reference to the following description of the attached drawings. Similar components may have the same reference signs in the various embodiments.

In the drawings:

FIG. 2a, 2b, 2c are isometric views of a vehicle seat according to an embodiment without upholstery elements in a initial position of a pivoting to the left and a pivoting to the right;

FIGS. 10a to 10f are different views and sectional views of a backrest base element according to an embodiment;

FIG. 12 is an exploded view of a backrest part according to an embodiment;

FIG. 14a, 14b, 14c show an elastic element according to an embodiment;

FIG. 15a, 15b show an elastic element according to an embodiment.

DETAILED DESCRIPTION

Figure 1A:
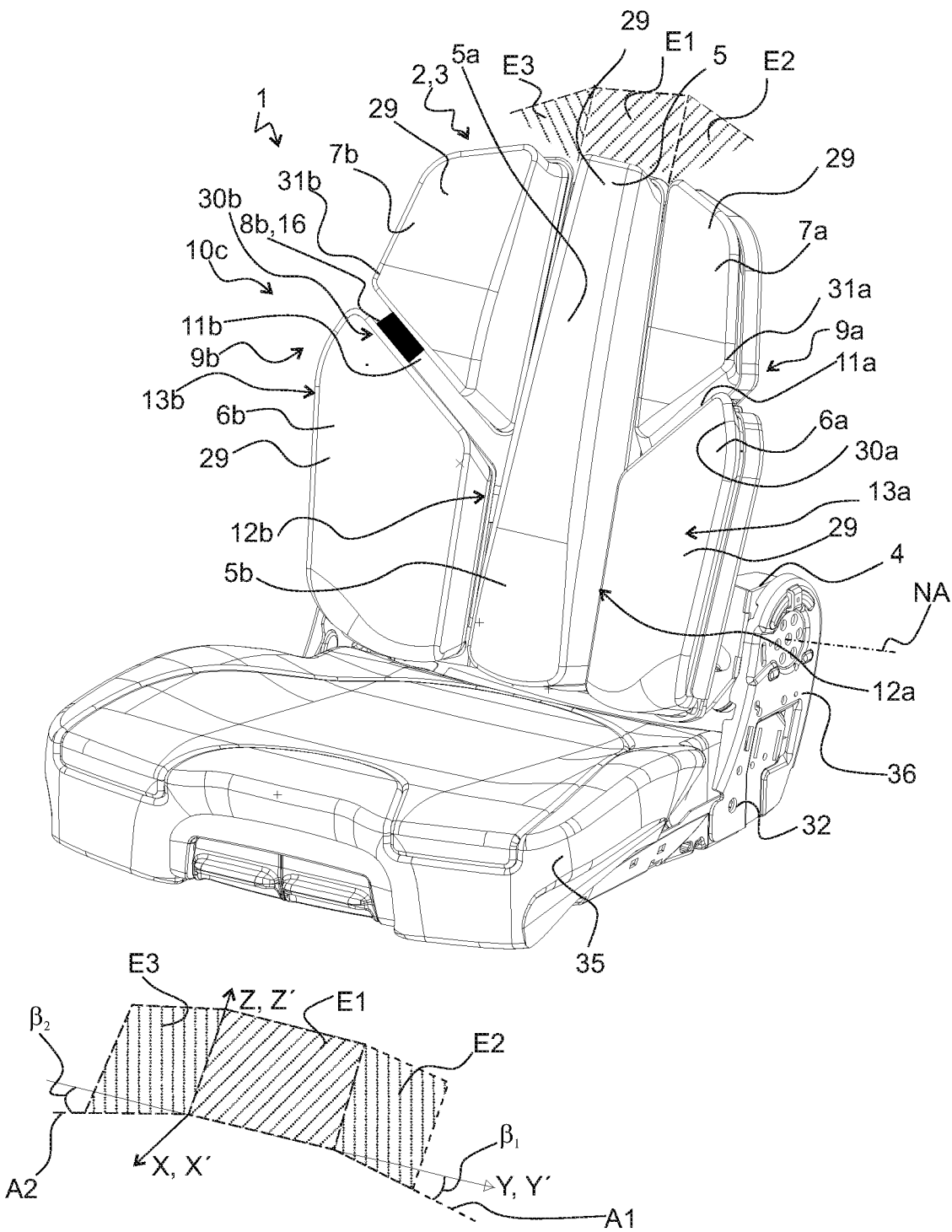
FIG. 1a, 1b, 1c are isometric views of the vehicle seat according to an embodiment in a initial position of a pivoting to the left and a pivoting to the right.
Figure 1B:
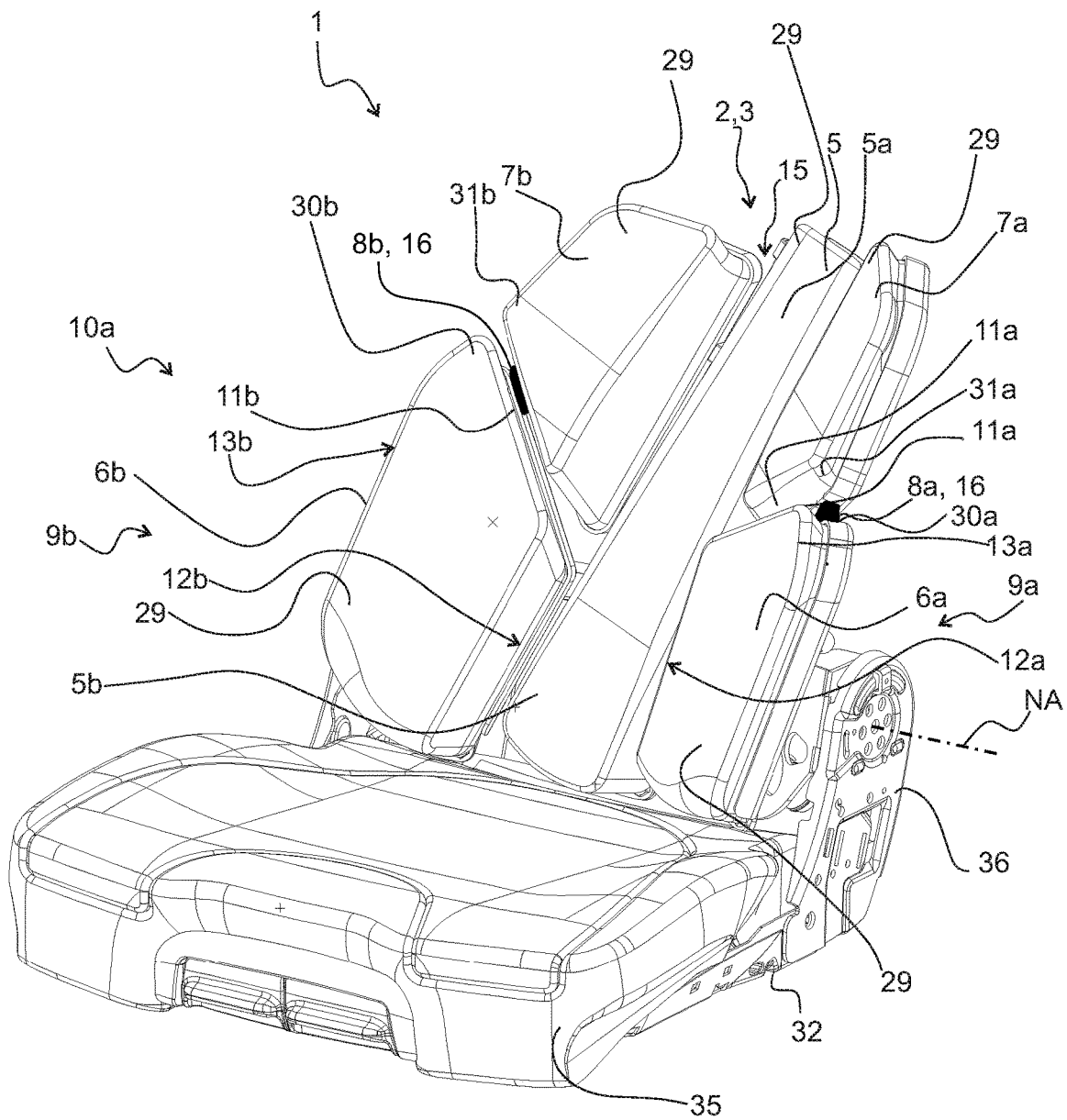
Figure 1C:
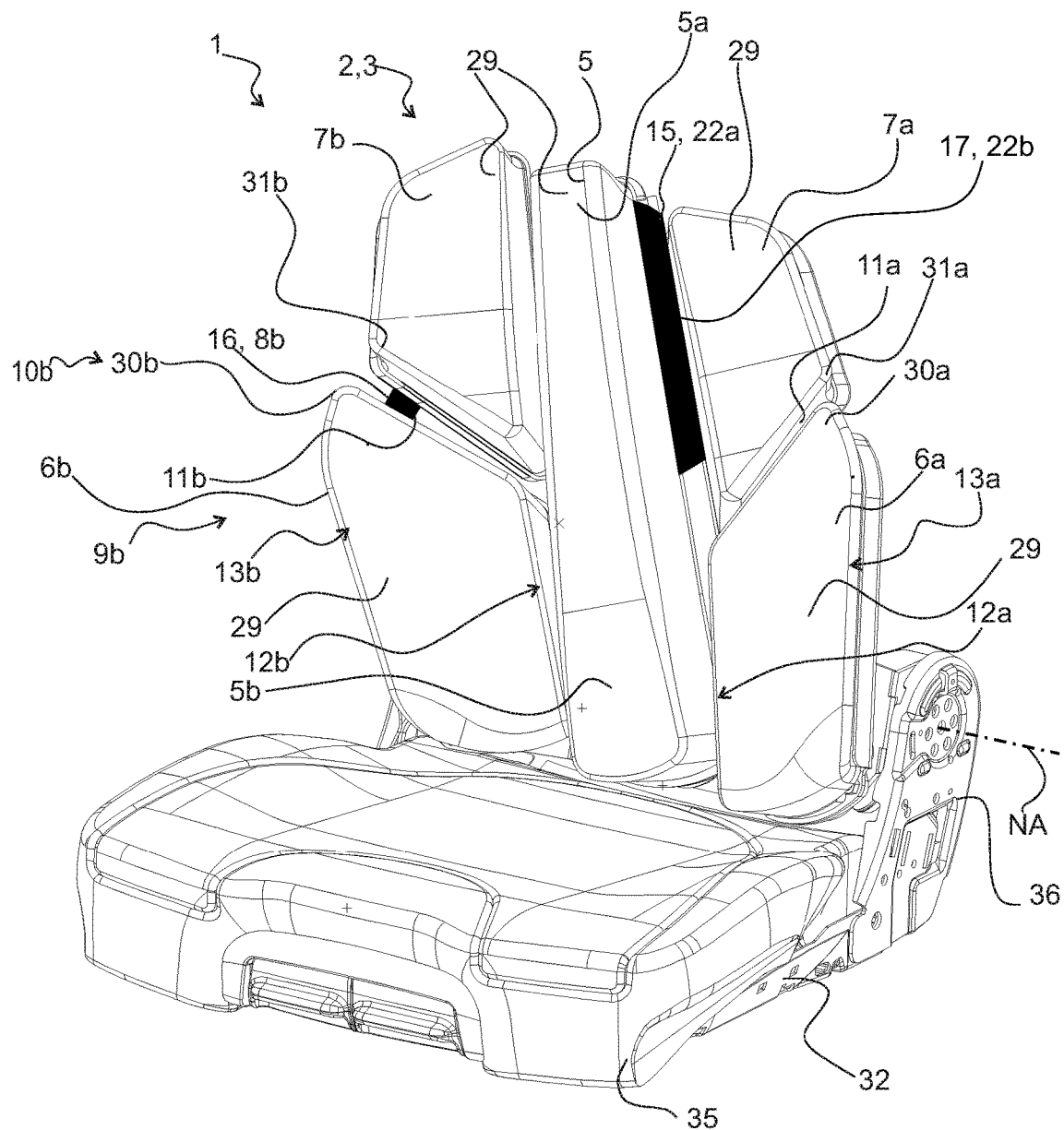

FIGS. 1 to 17 show a vehicle seat 1 having a backrest 2, which comprises a backrest part 3 and a backrest base element 4, the backrest part 3 comprising a middle backrest element 5, which is arranged pivotably on the backrest base element 4, wherein the backrest part 3 comprises two lower backrest side elements 6a, 6b and two upper backrest side elements 7a, 7b, which are each mechanically coupled to the middle backrest element 5, wherein the two lower backrest side elements 6a, 6b are arranged pivotably on the backrest base element 4, wherein at least one joint device 8a, 8b is provided in each case between a lower backrest side element 6a, 6b and an upper backrest side element 7a, 7b, wherein a lower backrest side element 6a, 6b and an upper backrest side element 7a, 7b are arranged at an angle $\alpha_L$, $\alpha_R$ to one another, wherein pivoting of the middle backrest element 5 causes a change in the angle $\alpha_L$, $\alpha_R$, wherein the joint device (8a, 8b) comprises at least one elastic element (16). Thus, at least one joint device 8a, 8b is provided in each case between a lower backrest side element 6a, 6b and an upper backrest side element 7a, 7b, wherein the upper backrest side elements 7a, 7b and the lower backrest side elements 6a, 6b are pivotable relative to one another, and the upper backrest side elements 7a, 7b and the lower backrest side elements 6a, 6b can each be arranged at an angle $\alpha_L$, $\alpha_R$ to one another.

The backrest 2 extends along a height axis Z, a width axis Y and a longitudinal axis X. The vehicle seat 1 extends along a height axis Z', a width axis Y' and a longitudinal axis X'.

Figure 13A:
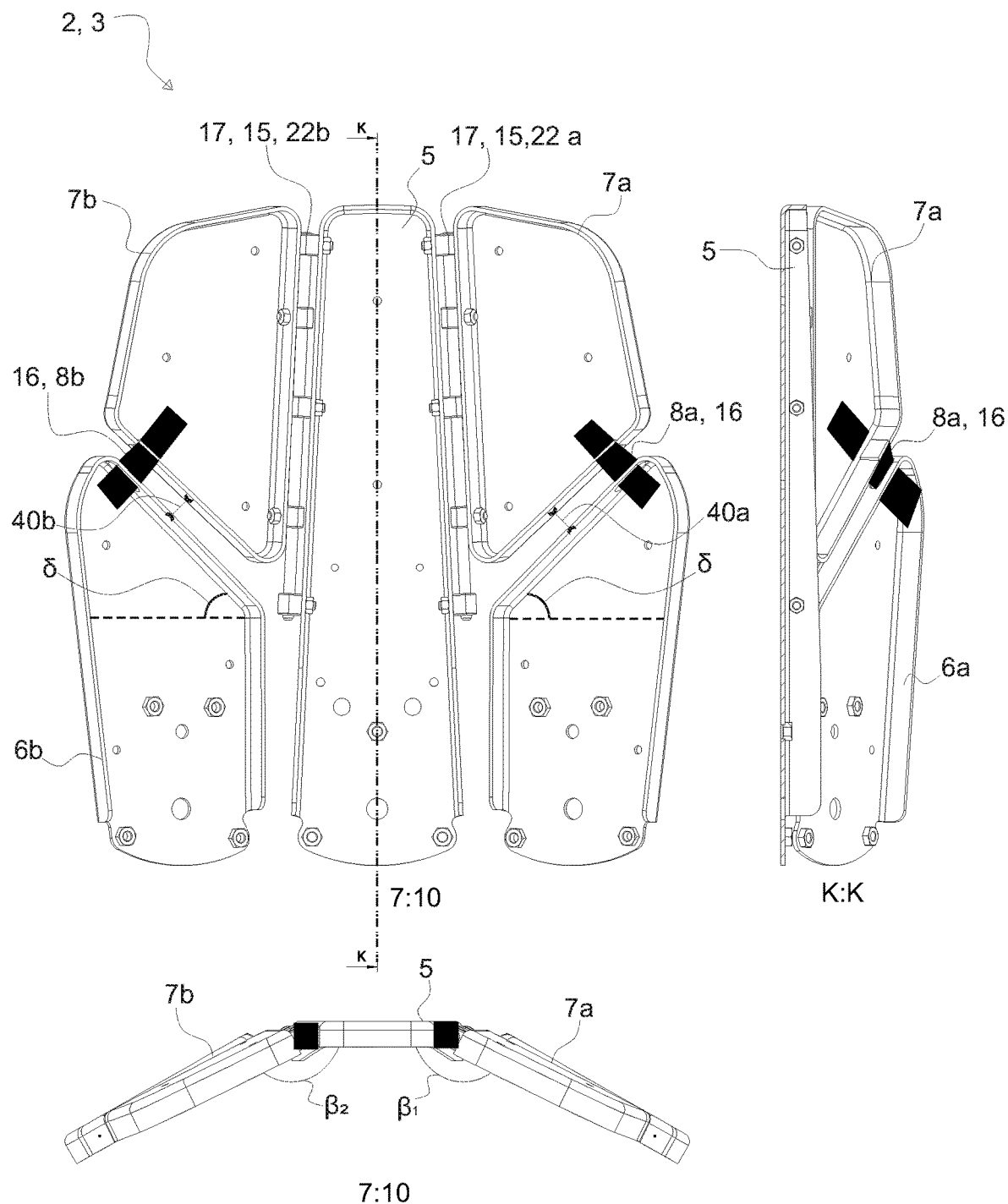
FIG. 13a, 13b, 13c are views of a backrest part according to an embodiment in a initial position of a pivoting to the left and a pivoting to the right.
Figure 13B:
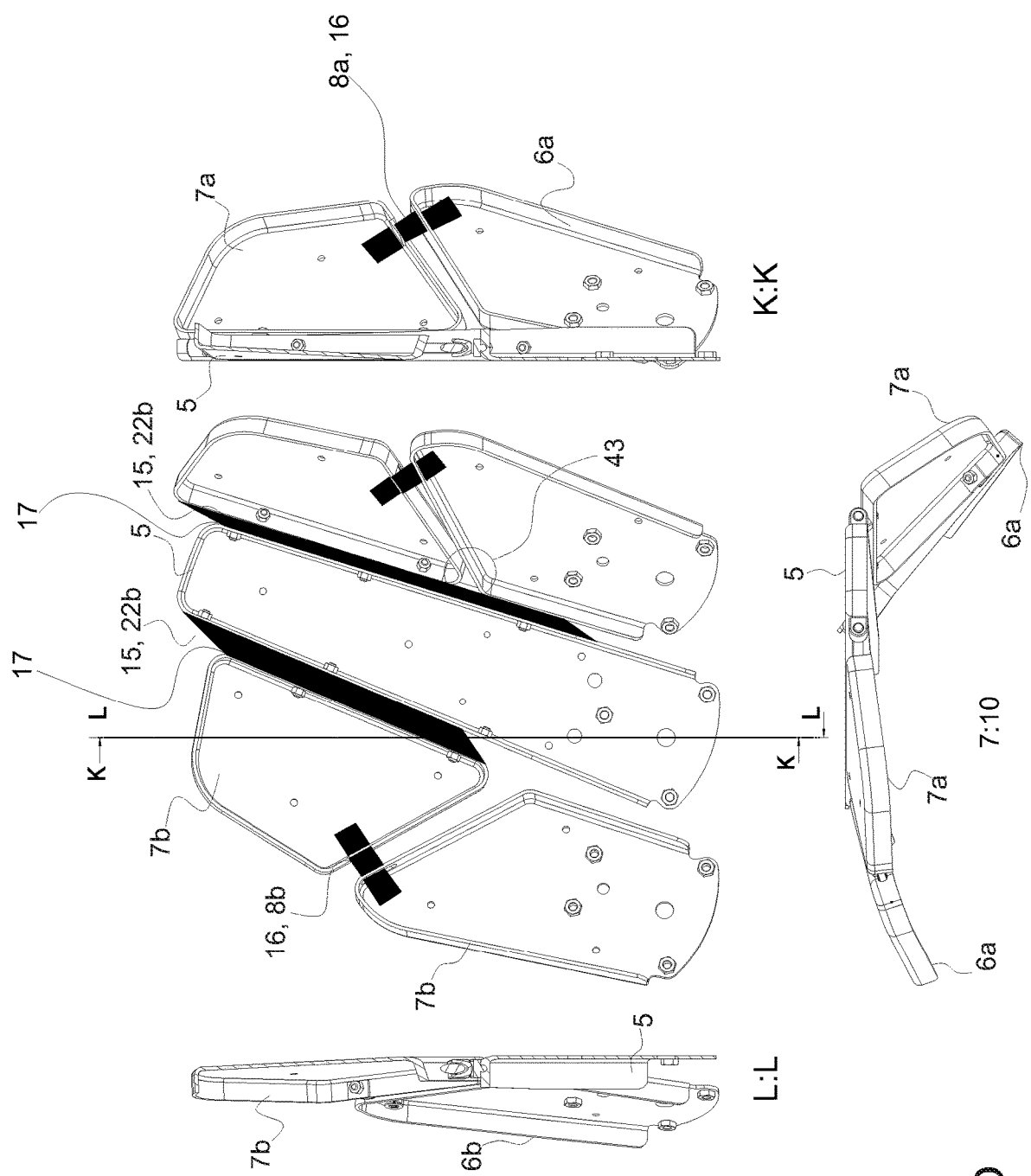
Figure 13C:
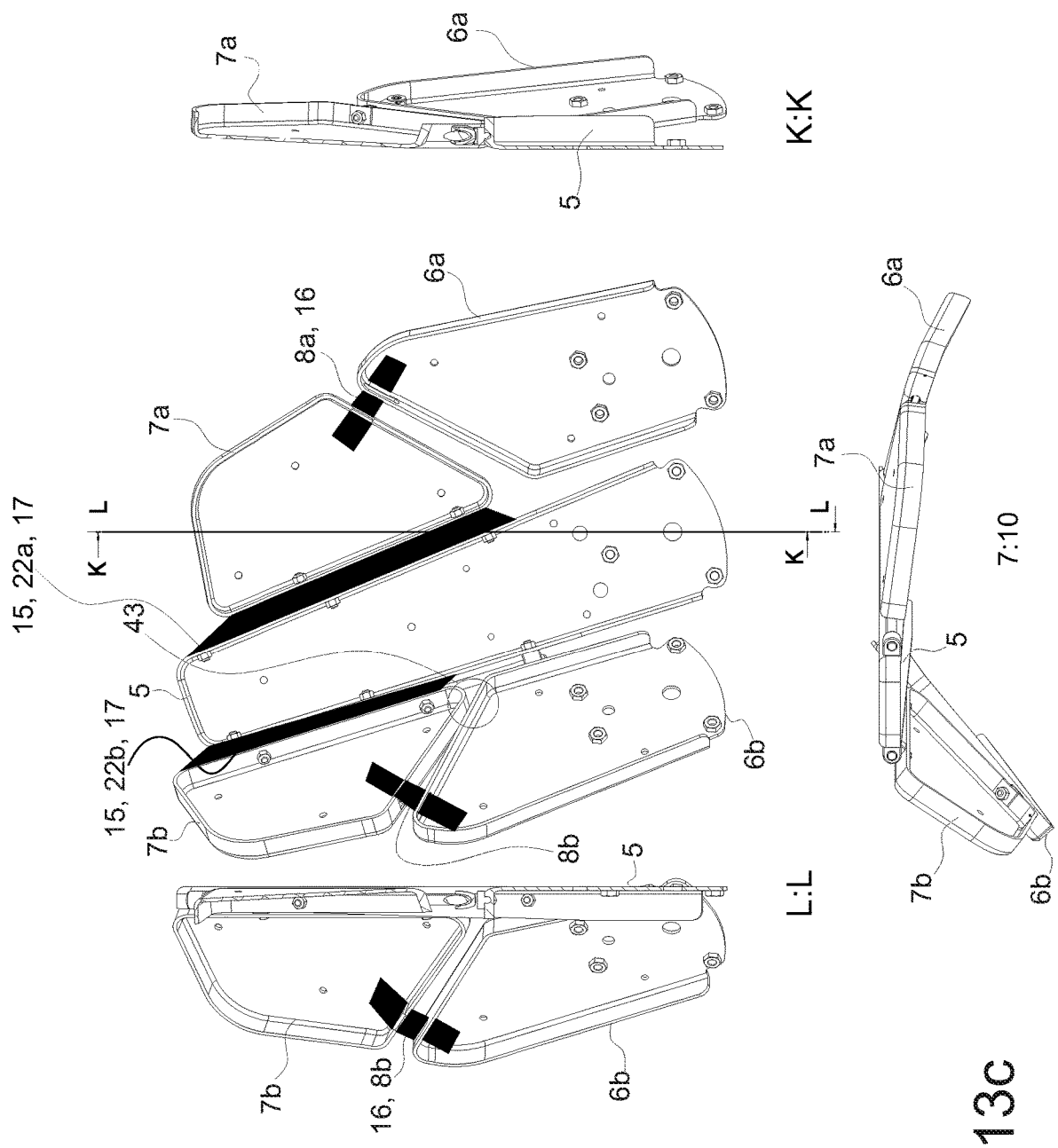

The vehicle seat 1 can thus assume various rotational positions 10a, 10b, 10c. In these rotational positions 10a, 10b, 10c, the backrest elements 5, 6a, 6b, 7a, 7b assume certain positions relative to one another. A first rotational position is the initial position 10c of the vehicle seat 1. In FIG. 1a, 2a, 3a, 4a, 5a, 6a, 7a, the vehicle seat 1 is shown in the initial position 10c. In the initial position 10c of the vehicle seat 1 or the backrest 2, the occupant is facing forwards and the middle backrest element 5 extends substantially along the height axis Z and thus serves as a support for the spinal column region or a part of the spinal column region of the occupant. In FIG. 13a, the backrest part 3 or the backrest elements 5, 6a, 6b, 7a, 7b are shown in the initial position 10c. If the driver turns to the right (viewing direction to the right), the backrest elements 5, 6a, 6b, 7a, 7b or the backrest part 3 pivot to the left and assume a second rotational position 10a. In FIG. 1b, 2b, 3b, 4b, 5b, 6b, 7b, the vehicle seat 1 is shown in this rotational position 10a. The backrest elements 5, 6a, 6b, 7a, 7b or the backrest part 3 are pivoted 20° to the left. In FIG. 13b, the backrest part 3 or the backrest elements 5, 6a, 6b, 7a, 7b are shown in this rotational position 10a. If the driver turns to the left (viewing direction to the left), the backrest elements 5, 6a, 6b, 7a, 7b or the backrest part 3 pivot to the right and assume a third rotational position 10b. In FIG. 1c, 2c, 3c, 4c, 5c, 6c, 7c, the vehicle seat 1 is shown in this rotational position 10b. The backrest elements 5, 6a, 6b, 7a, 7b or the backrest part 3 are pivoted 20° to the right. In FIG. 13c, the backrest part 3 or the backrest elements 5, 6a, 6b, 7a, 7b are shown in this rotational position 10b. It should be pointed out that the rotational positions 10a, 10b are exemplary positions; the rotation or pivoting of the backrest part 5 can take place continuously into further rotational positions.

The vehicle seat 1 comprises a seat base element 32, which is designed in the form of a plate and can be arranged on a further seat substructure or on a vehicle. A seat part 35, which comprises one or more upholstery elements, can be arranged on the seat base element 32. The seat part 35 can be arranged displaceably along the longitudinal axis X' relative to the seat base element 32. A locking device and/or a drive unit can be provided which locks and/or drives this displacement. The seat base element 32 comprises support elements 36 arranged on the outside along the width axis Y'. The support elements 36 are arranged at the rear along the longitudinal axis X'. The backrest base element 4 is arranged on these support elements 36 so as to be pivotable about an axis of inclination NA. Here, too, a locking device and/or a drive unit can be provided which locks and/or drives this inclination of the backrest 2 or the backrest part 3.

The backrest part 3 comprises a lower backrest side element 6a and an upper backrest side element 7a, which are arranged on the left side of the middle backrest element 5 and thus form a left side portion 9a of the backrest part 3. The backrest part 3 further comprises a lower backrest side element 6b and an upper backrest side element 7b, which are arranged on the right side of the middle backrest element 3 and form a right side portion 9b of the backrest part 3. The upper backrest side elements 7a, 7b and the lower backrest side elements 6a, 6b are designed as plate-like elements which are designed to accommodate upholstery elements 29. For this purpose, the plate-like elements have a border which extends forwards. FIG. 1a, 1b, 1c, 3a, 3b, 3c, 5a, 5b, 5c, 6a, 6b, 6c, 7a, 7b, 7c show the vehicle seat 1 or the backrest 2 with such upholstery elements 29. FIG. 2a, 2b, 2c, 4a, 4b, 4c, 8, 11, 12, 13a, 13b, 13c show the vehicle seat 1 or the backrest 2 without upholstery elements 29. The seat part 35 is also not shown in these drawings. The upholstery elements 29 form a two-part bearing/support surface for the occupant.

Figure 8:
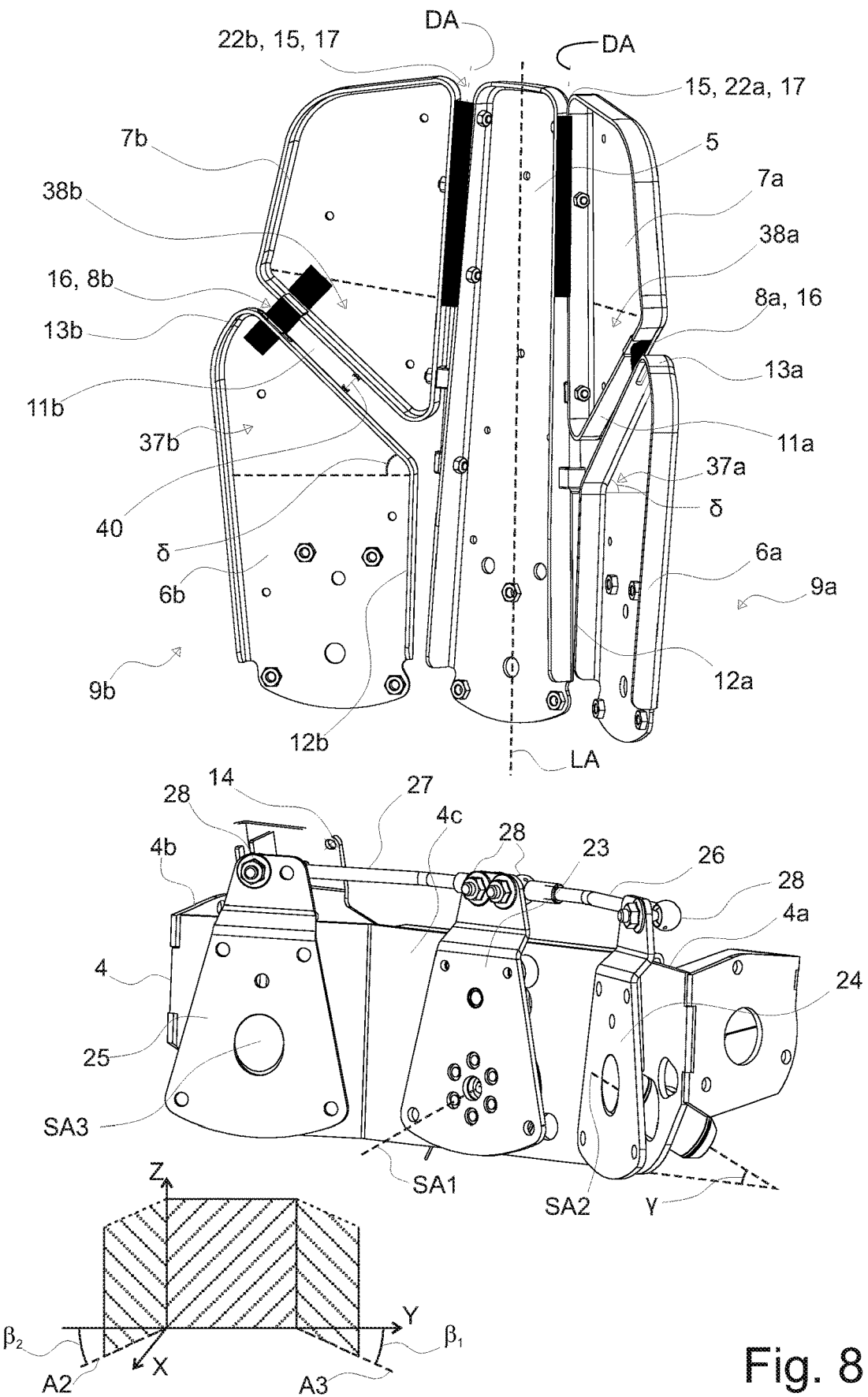
FIG. 8 is an isometric view of a backrest according to an embodiment.
Figure 9A:
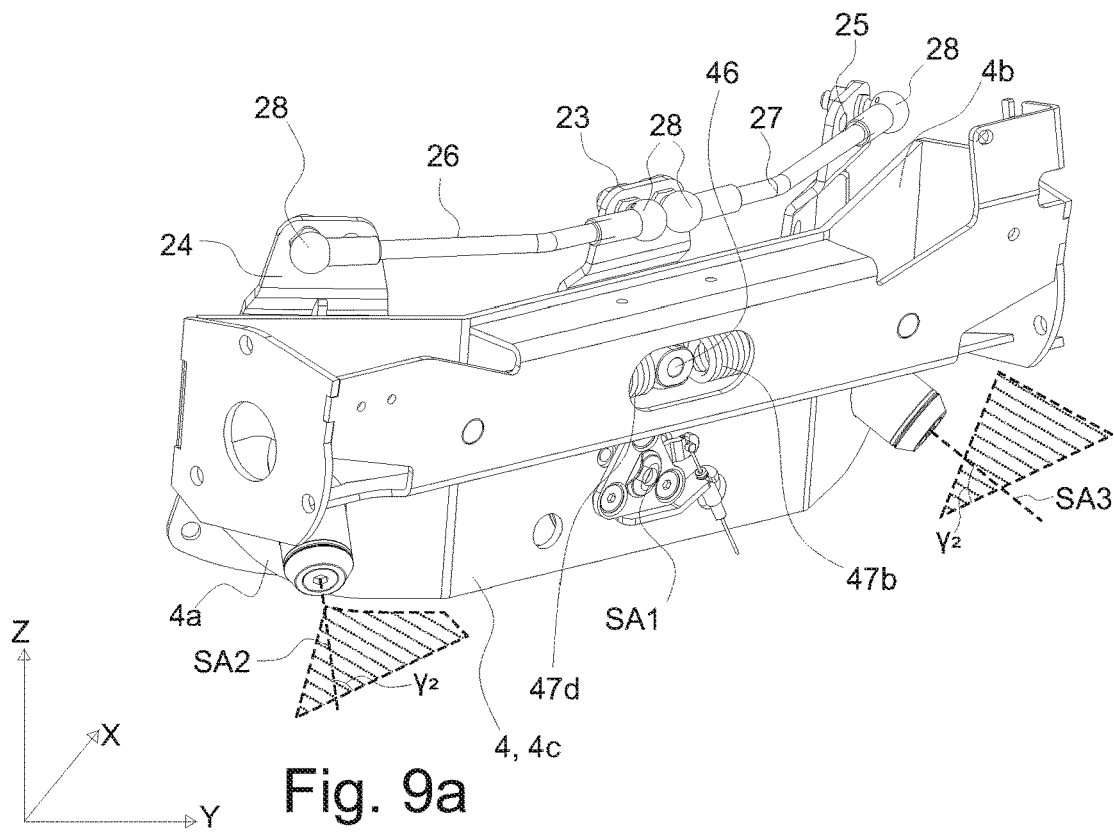
FIG. 9a, 9b are a rear view and a front view of a backrest base member.
Figure 9B:
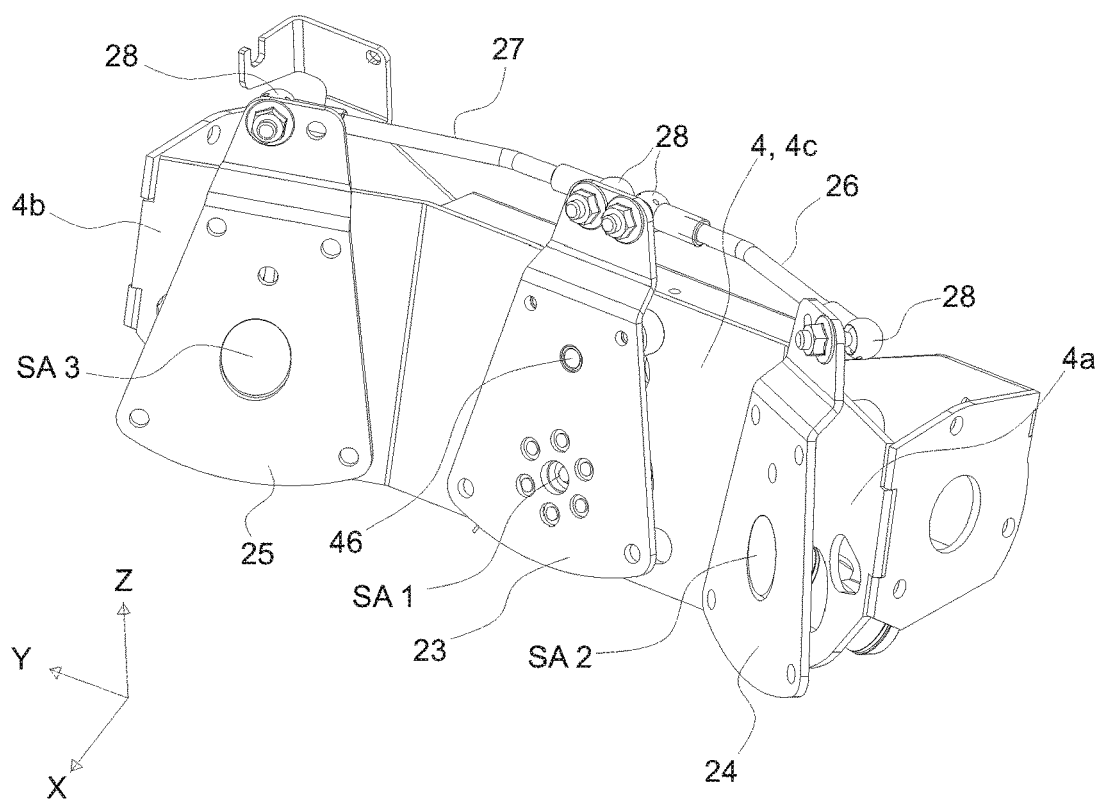
Figure 10D:
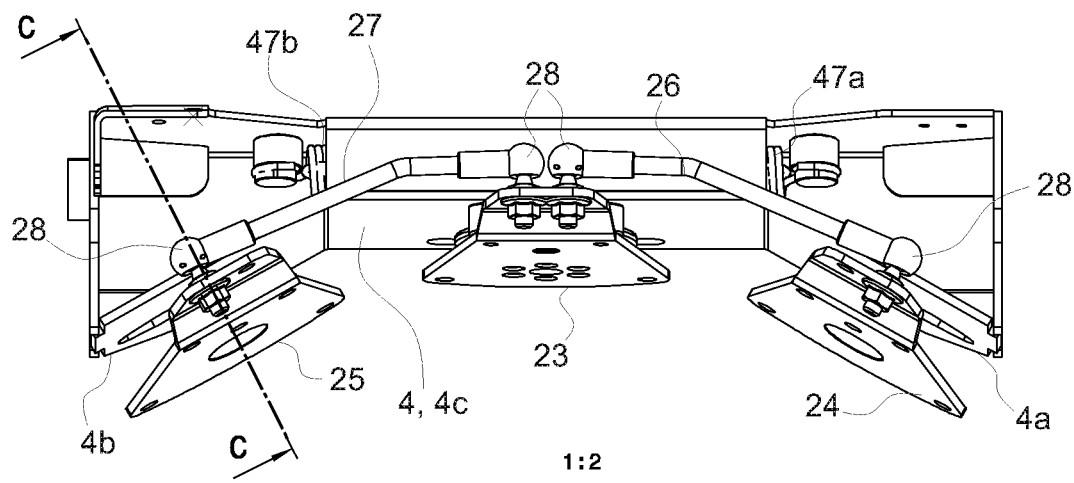
Figure 10E:
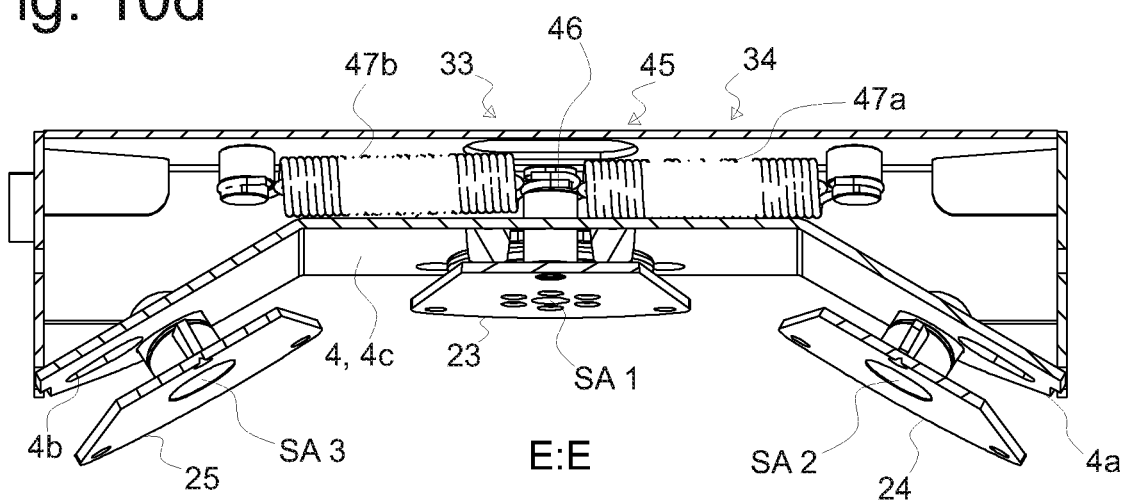
Figure 10F:
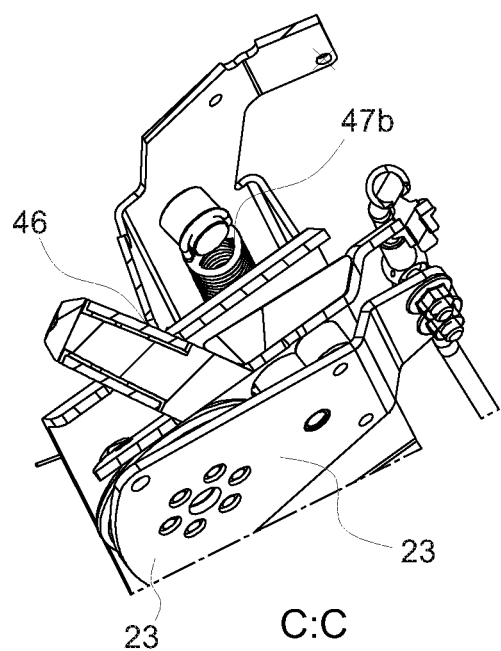

In the initial position 10c of the backrest 2, the middle backrest element 5 is arranged substantially in a first plane E1, which is spanned by a height axis Z of the backrest 2 and a width axis Y of the backrest 2. The left side portion 9a of the backrest part 3 is arranged in the initial position 10c substantially in a second side plane E2, which is spanned by the height axis Z of the backrest 2 and a first axis A1. Furthermore, the right side portion 10b of the backrest part 2 is arranged substantially in a third side plane E3 which is spanned by the height axis Z of the backrest and a second axis A2. The width axis Y and the first axis A1 enclose a first angle of inclination $\beta_1$ and the second axis A2 encloses an angle of inclination $\beta_2$ with the width axis Y. This is shown in FIGS. 1 and 8. The angles of inclination $\beta_1$, $\beta_2$ are preferably in a range between 5° and 80°, more preferably in a range between 20° and 70°, more preferably in a range between 30° and 50°. The occupant is supported laterally by the side portions 9a, 9b which are oriented obliquely forwards. This is particularly advantageous if the vehicle sways.

The backrest base element 4 is explicitly shown in FIGS. 8, 9a, 9b, 10a to 10f. It can be seen here that the backrest base element 4 has a middle region 4c which extends substantially parallel to the first plane E1. Furthermore, the backrest base element 4 has two side regions 4a, 4b. A left side region 4a of the backrest base element 4 extends substantially parallel to the second side plane E2 and a right side region 4b of the backrest base element 4 extends substantially parallel to the third side plane E3. The lower backrest side elements 6a, 6b are each arranged on the side regions 4a, 4b of the backrest base element 4 so as to be pivotable about a second pivot axis SA2 or a third pivot axis SA3. The middle backrest element 5 is arranged on the middle region 4c of the backrest base element 4 so as to be pivotable about a first pivot axis SA1. A fastening element 25, 26, 23 is pivotably arranged in each of the mentioned regions 4a, 4b, 4c. The middle backrest element and the lower backrest side elements 6a, 6b are fastened to these fastening elements 25, 26, 23. One fastening element 23 is arranged in the middle region 4c so as to be pivotable about a pivot axis SA1. The second fastening element 24 is firmly connected to the lower backrest side element 6a arranged on the left side and is pivotable about the second pivot axis SA2 relative to the backrest base element 4. The third fastening element 25 is firmly connected to the lower backrest side element 6b arranged on the right side and is pivotable about the third pivot axis SA3 relative to the backrest base element 4.

The pivot axis SA1 is substantially horizontal, i.e. it extends in a plane which is spanned by the width axis Y and the longitudinal axis X and/or is parallel to the longitudinal axis X. In contrast to this, the pivot axes SA2 and SA3 are not oriented horizontally, but inclined. The second pivot axis SA2 and the third pivot axis SA3 extend obliquely upwards along the longitudinal axis X and the height axis Z. The second pivot axis SA2 and the third pivot axis SA3 accordingly run obliquely upwards, starting from a rear region of the backrest 2, which faces away from the occupants, to or through the respective lower backrest side elements 6a, 6b or the respective fastening elements 24, 25. The second and the third pivot axis SA2, SA3 thus preferably enclose an angle $\gamma_2$, $\gamma_3$ with a plane which is spanned by the longitudinal axis X and the width axis Y. These angles $\gamma_2$, $\gamma_3$ are preferably in a range between 10° and 80°, more preferably in a range between 20° and 70°, more preferably in a range between 30° and 60°. Due to the inclined pivot axes SA2 and SA3, when the lower backrest side elements 6a, 6b are pivoted, an upper edge region 30a, 30b of the lower backrest side element 6a, 6b is displaced forwards towards the occupant.

A first coupling mechanism 14 is provided, by means of which a mechanical coupling of the middle backrest element 5 to the two lower backrest side elements 6a, 6b takes place. Accordingly, the first coupling mechanism is a forced control, which has the effect that a pivoting movement of the middle backrest element 5 is transmitted to the lower backrest side elements 6a, 6b. Likewise, a pivoting movement of a lower backrest side element 6a, 6b is transmitted to the middle backrest element 5 and the further lower backrest side element 6a, 6b. A turning movement of an occupant results in a force being introduced into the backrest part 3. The introduction of force in turn causes the middle backrest element 5 and the two lower backrest side elements 6a, 6b to pivot relative to the backrest base element 4.

The first coupling mechanism comprises a first coupling rod 26 which connects the first fastening element 23 and the second fastening element 24. Furthermore, the first coupling mechanism comprises a second coupling rod 27, which connects the first fastening element 23 and the third fastening element 25. The coupling rods are each fastened to the respective fastening elements 23, 24, 25 by means of a ball joint 28. Due to the inclined arrangement of the lower backrest side elements 6a, 6b relative to the middle backrest element 5 or the inclined arrangement of the second fastening element 24 and the third fastening element 25 relative to the first fastening element 23, the coupling rods are angled in such a way that a first portion of the coupling rod runs substantially parallel to the first portion of the backrest base element 4 and a second portion runs substantially parallel to the second portion of the backrest base element 4. The joint socket of the ball joints is arranged at the relevant end of the coupling rods 26, 27. The relevant ball head is fastened to the fastening elements 23, 24, 25 via a ball stud.

Figure 7A:
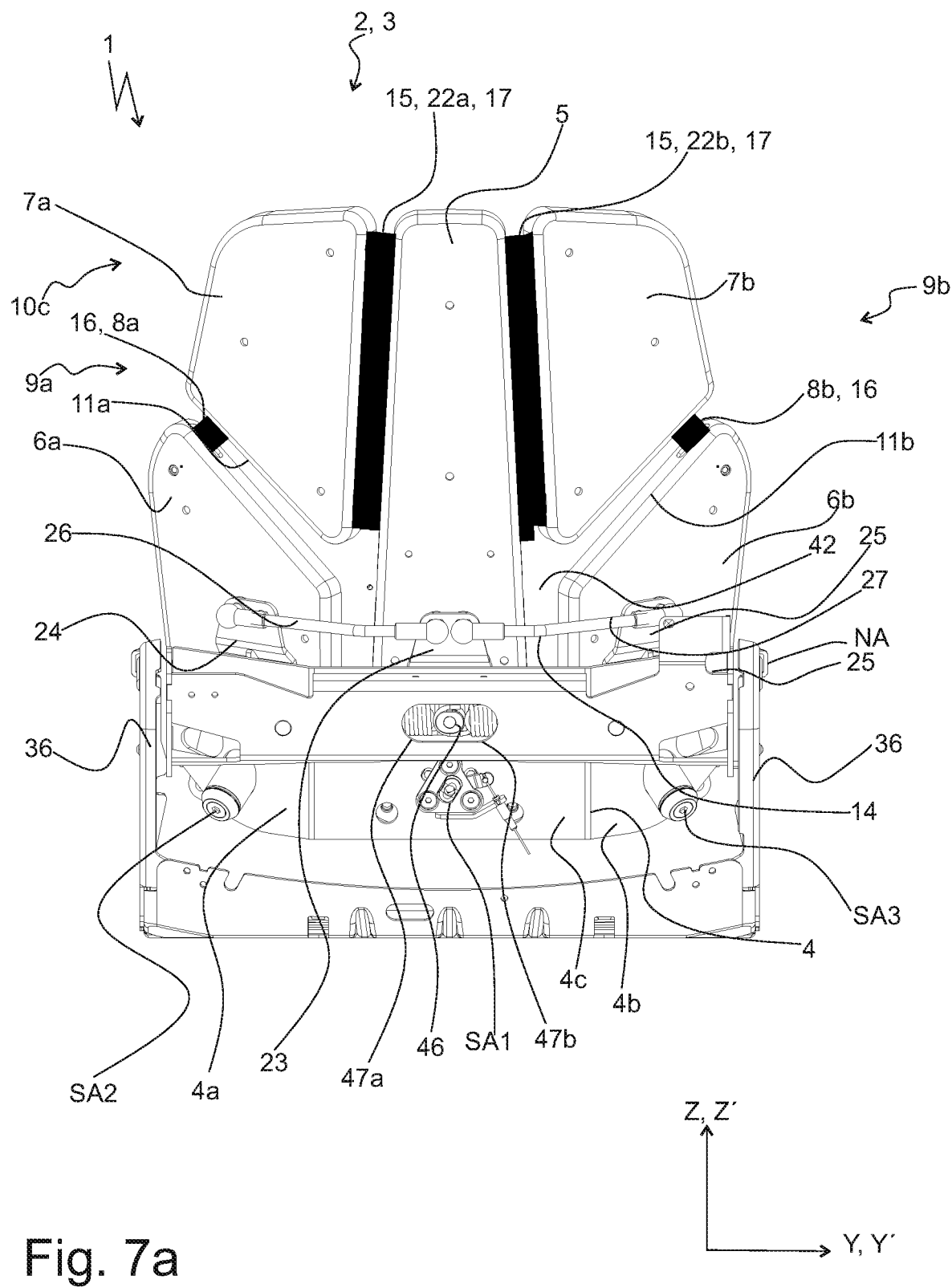
FIG. 7a, 7b, 7c are views from behind of a vehicle seat according to an embodiment in a initial position of a pivoting to the left and a pivoting to the right.
Figure 7B:
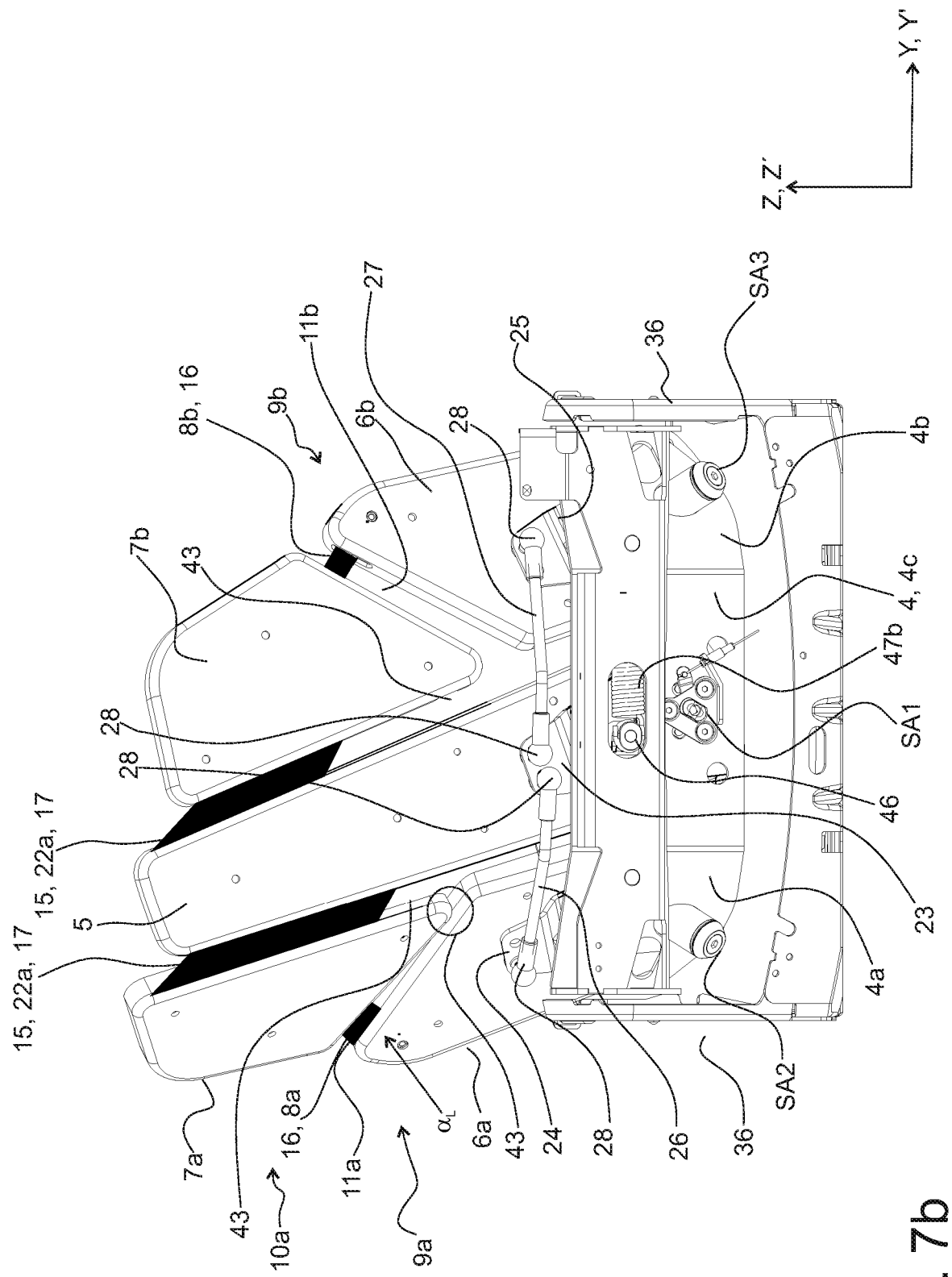
Figure 7C:
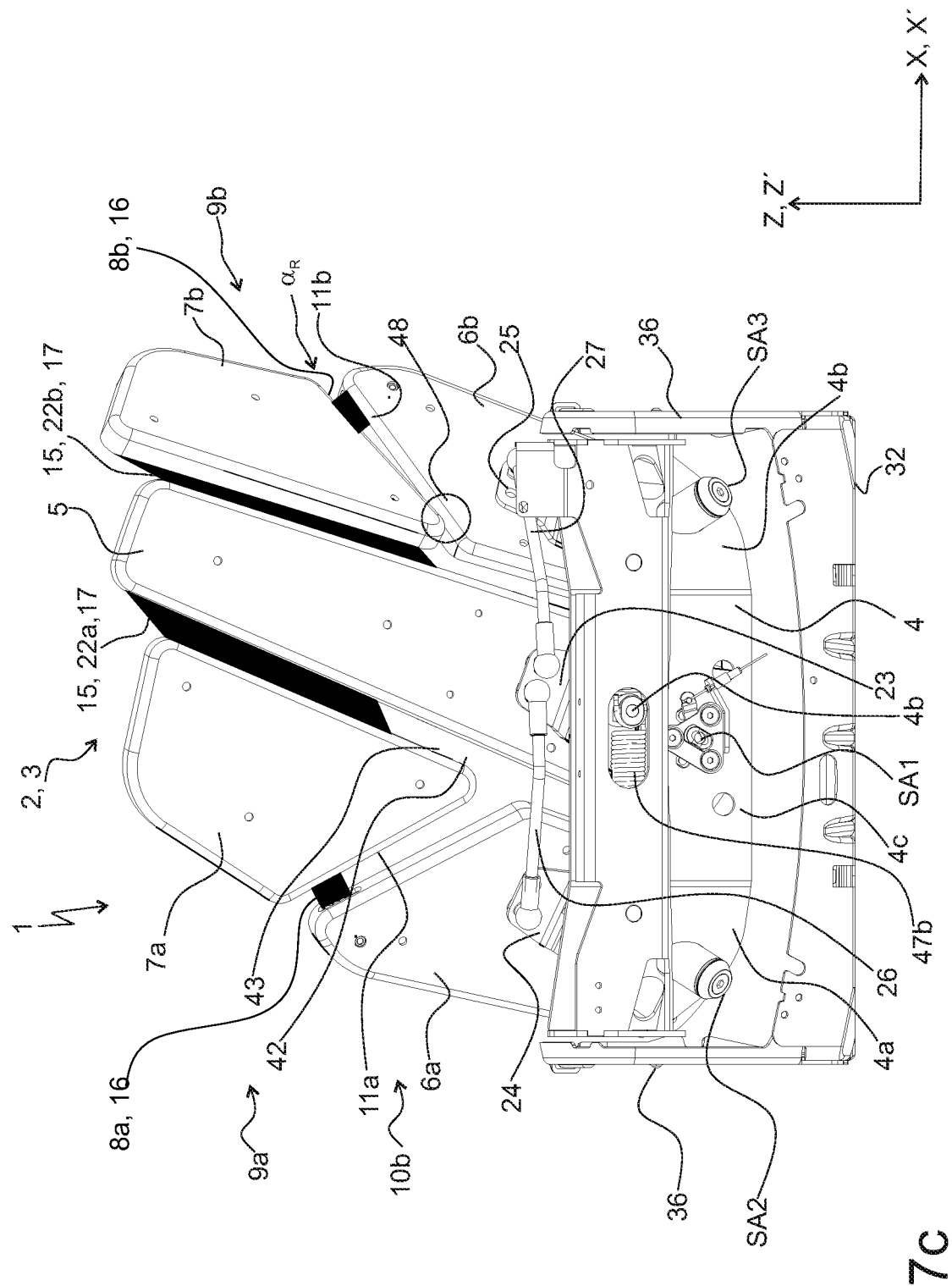

Accordingly, two ball joints 28 are arranged on the first fastening element. In the initial position 10c, these two ball joints are located on an axis substantially parallel to the width axis X. When the backrest elements 5, 6a, 6b, 7a, 7b are pivoted, a ball joint 28 is displaced downwards along the height axis and a ball joint is displaced upwards along the height axis Z. The ball head then rotates according to this movement. For example, in the case of pivoting to the left, the left ball joint 28, which is connected to the first coupling rod 26, is displaced downwards. The right ball joint 28, which is connected to the second coupling rod 27, is displaced upwards. This is shown in FIG. 7a, 7b, 7c. The ball joints 28, which are arranged on the second fastening element 24 and the third fastening element 25, transmit a pushing or pulling movement. Due to the inclined arrangement of the lower backrest side elements 6a, 6b relative to the middle backrest element 5 or the inclined arrangement of the second fastening element 24 and the third fastening element 25, the relevant ball head rotates forwards or backwards on the second fastening element 24 and the third fastening element 25.

Furthermore, a second coupling mechanism 15 is provided, by means of which the middle backrest element 5 is mechanically coupled to the two upper backrest side elements 7a, 7b. The second coupling mechanism 15 comprises a left coupling device 22a and a right coupling device 22b, by means of which the left upper backrest side element 7a and the right backrest side element 7b, respectively, are arranged on the middle backrest element 5. The relevant coupling device 22a, 22b allows a guided translational movement of the upper backrest side elements 7a, 7b relative to the middle backrest element 5 along a longitudinal axis LA of the middle backrest element. Furthermore, the coupling devices 22a, 22b allow a rotary movement of the upper backrest side elements 7a, 7b relative to the middle backrest element 5 about an axis of rotation DA which runs parallel to the longitudinal axis LA of the middle backrest element 5.

The coupling device 22a, 22b comprises at least one second elastic element 17, which is arranged between an upper backrest side element and the middle backrest element. This at least one elastic element can be designed in many ways. The coupling device 22a, 22b comprises a plurality of second elastic elements 17 which are arranged along a longitudinal extent of the upper backrest side element 7a, 7b and/or the middle backrest element 5. The second elastic elements 17 can be arranged over the entire longitudinal extent of the upper backrest side element 7a, 7b and/or the middle backrest element 5 or only along a portion of the longitudinal extent of the upper backrest side element 7a, 7b and/or the middle backrest element 5. It would also be conceivable that a coupling device 22a, 22b is designed as a single second elastic element 17. This one second elastic element 17 can also preferably be arranged over the entire longitudinal extent of the upper backrest side element 7a, 7b and/or the middle backrest element 5 or only along a portion of the longitudinal extent of the upper backrest side element 7a, 7b and/or the middle backrest element 5.

Figure 11:
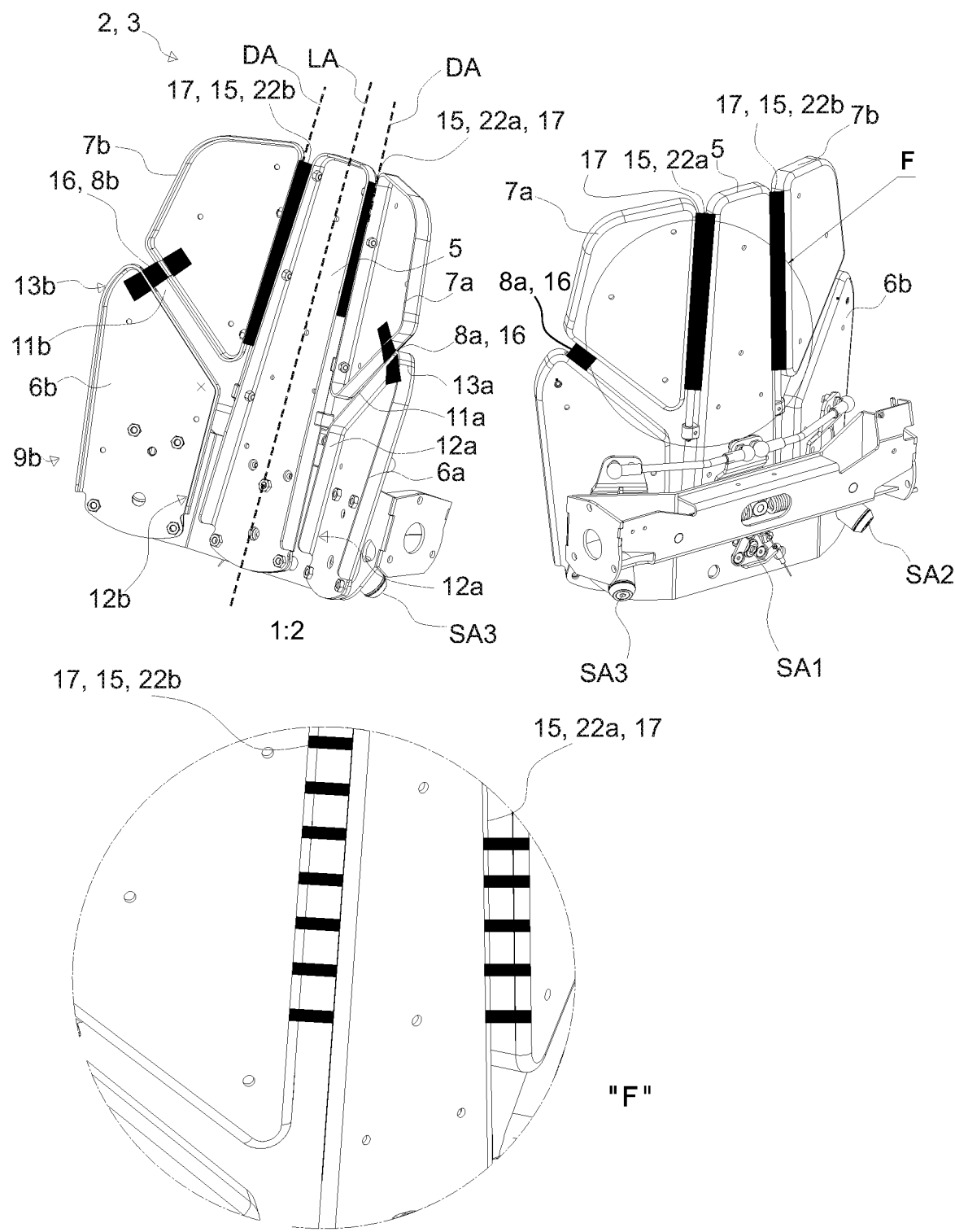
FIG. 11 is a front view and a rear view of a backrest part according to an embodiment.

Possible configurations of the second elastic element are shown in FIG. 11, 14a, 14b, 14c, 15a, 15b. The first elastic element 16 can be configured as shown in these drawings. The following description can therefore apply to both the first elastic element 16 and the second elastic element 17. A possible embodiment of an elastic element 16, 17 is shown in FIGS. 14a, 14b and 14c. Such an elastic element 16, 17 has a base body 18, which can be of rectangular or square design, for example, and extends along a longitudinal axis LE and a vertical extent HE. There are recesses 19 in this base body 18. In FIG. 14a, the elastic element 16, 17 is shown in an original state. The recesses run substantially parallel to an outer edge and are oriented substantially along the vertical extent HE. In FIG. 14b, a deformed state of the elastic element 16, 17 is shown. The elastic element 16, 17 experiences a deformation in the form of a shear, since an upper side 18a is displaced relative to a lower side 18b along the longitudinal axis LK. Furthermore, the elastic element can be rotated about an axis of rotation which runs parallel to the longitudinal axis LK, i.e. the upper side 18a is rotated about the axis of rotation relative to the lower side 18c, as sketched by way of example in FIG. 14c. This takes place in the case of the coupling devices 22a, 22b. In the case of a second elastic element 17, such a deformation in the form of a shear and a twist would be caused by the relative movement of an upper backrest side element 7a, 7b with respect to the middle backrest element. The first elastic element is rotated about an axis parallel to the vertical extent HE. In the case of a first elastic element 16, such a deformation in the form of a shear and a corresponding twist would be caused by the relative movement of an upper backrest side element 7a, 7b with respect to a lower backrest side element. The upper and lower sides could each be arranged on a fastening element 20, which is preferably made of a dimensionally stable plastics material. The fastening to the backrest elements 5, 6a, 6b, 7a, 7b can preferably take place by means of these fastening elements 20.

A further possible embodiment of the coupling device 22a, 22b and/or the joint device 8a, 8b is shown in FIGS. 15a and 15b. The coupling device 22a, 22b and the joint device 8a, 8b comprise a plurality of elastic elements 16, 17 which are fastened to the corresponding backrest elements 5, 6a, 6b, 7a, 7b. The elastic elements 16, 17 have an elongated portion 41, and fixing portions 42 are provided at the ends thereof. The elongated portion 41 and the fixing portions 42 can have a circular cross section, a square cross section or another cross section. The fixing portions 42 are larger in width and depth or have a larger diameter than the elongated portion 41. In other words, the elastic elements 16, 17 are designed in the shape of a bone. Such an elastic element is also shown, for example, in FIG. 2b. In FIG. 15a, the elastic element 16, 17 is shown in an original state. The elongated portion 41 runs substantially parallel to the vertical extent HE. A deformed state of the elastic elements 16, 17 is shown in FIG. 15b. The elastic elements 16, 17 undergo a deformation in the form of an expansion, since the fastening edges, analogously to FIG. 15b, perform a shear along the longitudinal axis LK. Furthermore, the elastic elements undergo twisting movements as described with regard to FIG. 14b, 14c 15b. The fixing portions 42 can be attached directly to the respective backrest elements 5, 6a, 6b, 7a, 7b or to a fastening element 20, which in turn is attached to the respective backrest elements 5, 6a, 6b, 7a, 7b.

It would also be conceivable that at least one undercut, preferably a plurality of undercuts, are provided on the upper backrest side elements 7a, 7b and the lower backrest side elements 6a, 6b and that the first elastic element 16 is moulded directly onto these backrest elements 6a, 6b, 7a, 7b. It would also be conceivable for at least one undercut, preferably a plurality of undercuts, to be provided on the upper 7a, 7b backrest side elements and the middle backrest element 5 and for the second elastic element 17 to be moulded directly onto these backrest elements 6a, 6b, 7a, 7b. The advantageous provision of the undercuts can ensure that this connection has sufficient mechanical load-bearing capacity.

In the case of an exemplary displacement to the left into the second rotational position 10a, the left upper backrest side element 7a is accordingly displaced upwards along the longitudinal axis LA of the middle backrest element 5. The left upper backrest side element 7a accordingly protrudes beyond the end of the longitudinal extent of the middle backrest element 5. At the same time, the left upper backrest side element 7a rotates about the axis of rotation DA, so that it is rotated forwards towards the occupant. The right upper backrest side element 7b is displaced downwards along the longitudinal axis LA of the middle backrest element 5. The right upper backrest side element 7b accordingly dips below the end of the longitudinal extent of the middle backrest element 5. At the same time, the right upper backrest side element 7b rotates about the axis of rotation DA, so that it is rotated forwards towards the occupant. Such an exemplary second rotational position 10a is shown in FIG. 1b, 2b, 3b, 4b, 5b, 6b, 7b, 13b. A displacement to the right can be described analogously and is shown in FIG. 1c, 2c, 3c, 4c, 5c, 6c, 7c, 13c.

The upper backrest side elements 7a, 7b and the lower backrest side elements 6a, 6b are spaced apart from one another along the height axis Z such that a slot 11a, 11b is formed between these two elements 6a, 6b, 7a, 7b. Starting from an inner region 12a, 12b of a side portion 9a, 9b, this slot 11a, 11b runs obliquely upwards along the height axis Z to an outer region 13a, 13b of a side portion 9a, 9b of the backrest part 3. The two slots 11a, 11b thus run in a V-shape towards the middle backrest element 5. The slot 11a, 11b encloses an angle δ with a horizontal axis 39. The horizontal axis 39 lies in a plane which is spanned by the width axis Y and the longitudinal axis X. The angle δ is preferably in a range between 20° and 70°, preferably in a range between 30° and 60°, more preferably in a range between 40° and 50°. This is shown, for example, in FIGS. 8 and 13a. The upper backrest side elements 7a, 7b and the lower backrest side elements 6a, 6b have a corresponding shape. An upper region 37a, 37b of the lower backrest side elements 6a, 6b has substantially the shape of an irregular right-angled triangle. The hypotenuse of this triangle forms the upper edge of the lower backrest side elements 6a, 6b facing the slot 11a, 11b. Likewise, a lower region 38a, 38b of the upper backrest side elements 7a, 7b has substantially the shape of an irregular right-angled triangle. The hypotenuse of this triangle forms the lower edge of the upper backrest side elements 7a, 7b facing the slot. In the initial position 10c, a distance 40a, 40b between the upper 7a, 7b and the lower backrest side elements 6a, 6b or the slot width is constant along the entire length of the slot 11a, 11b.

Figure 2B:
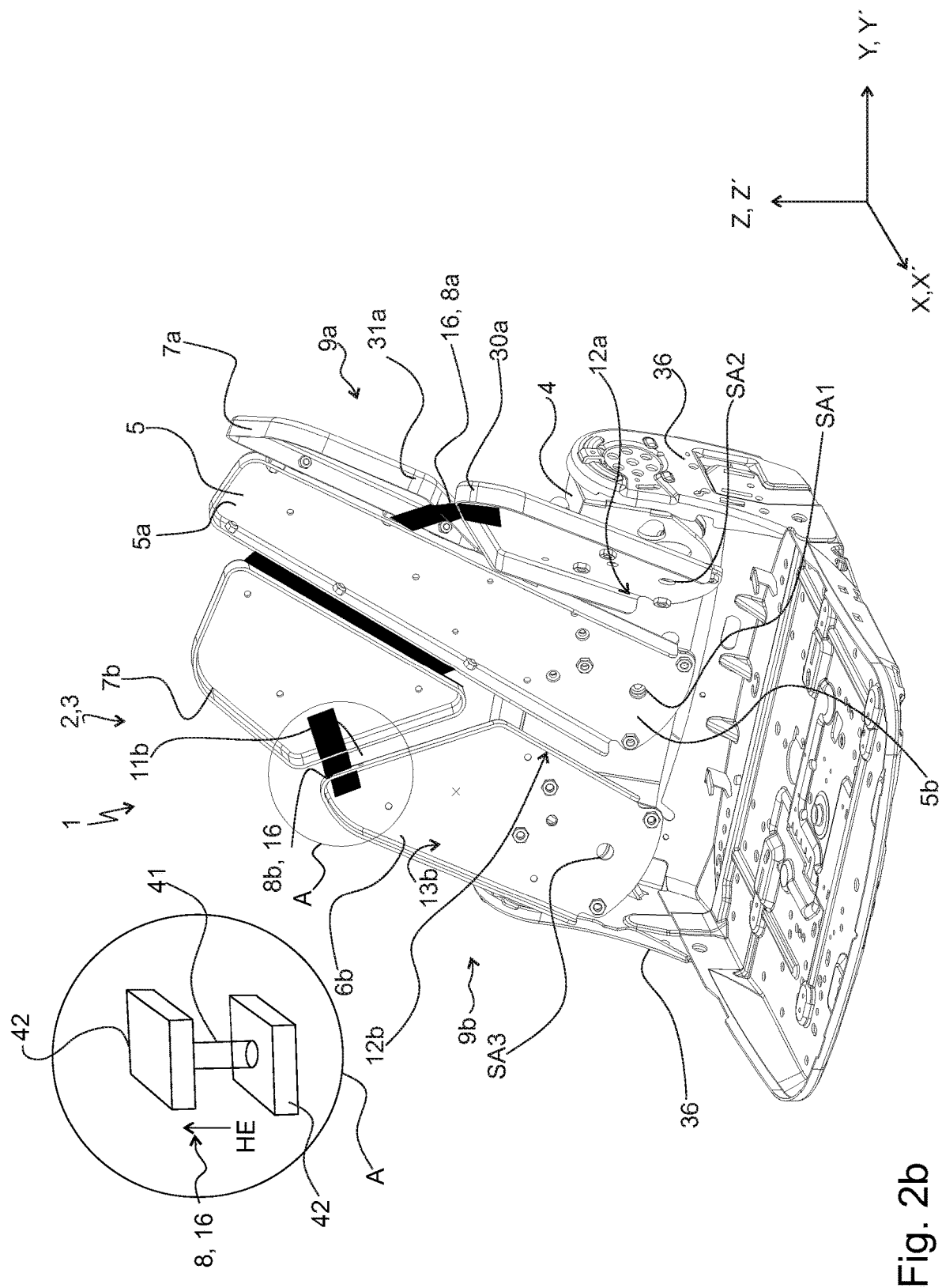
Figure 2C:
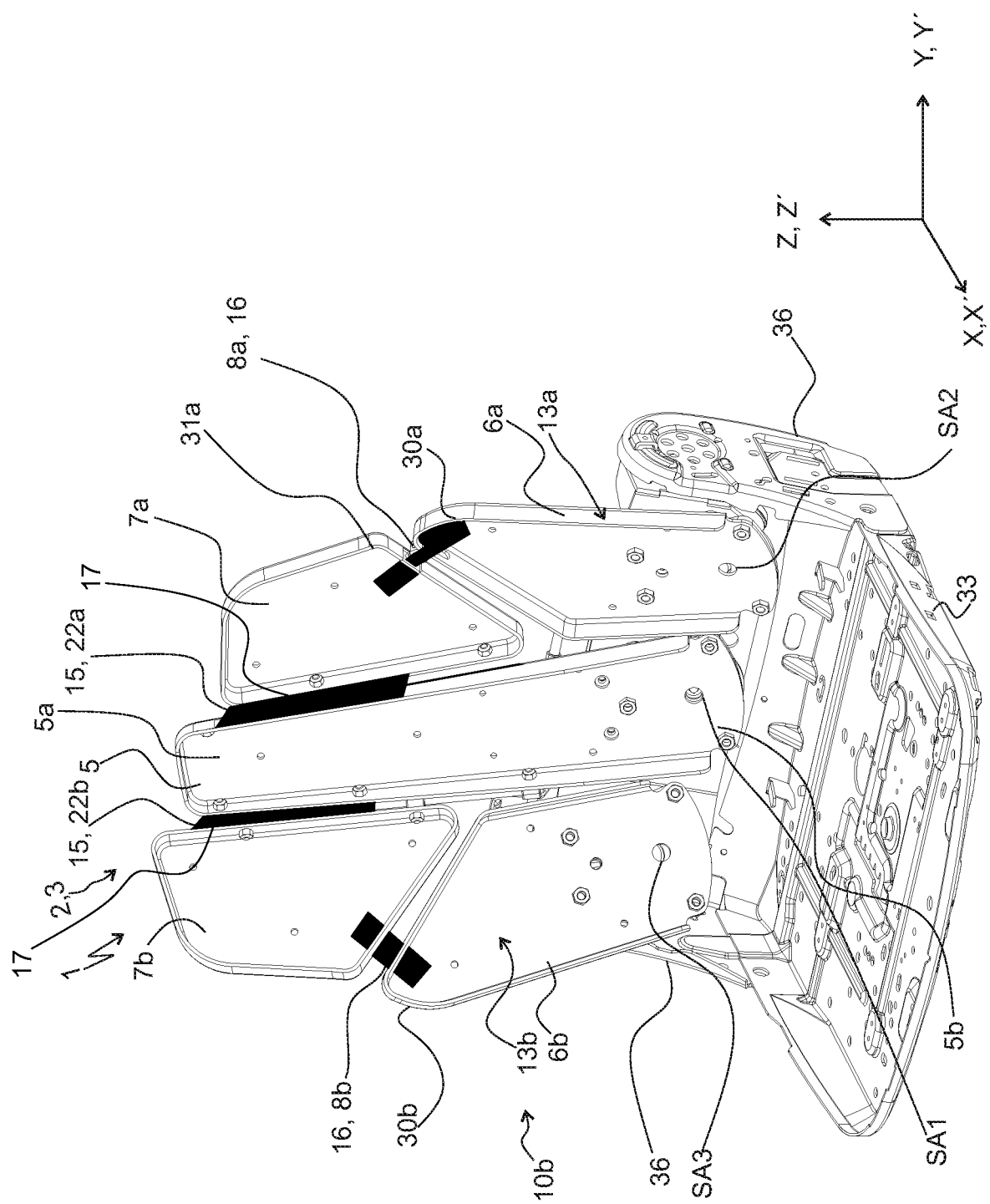
Figure 3A:
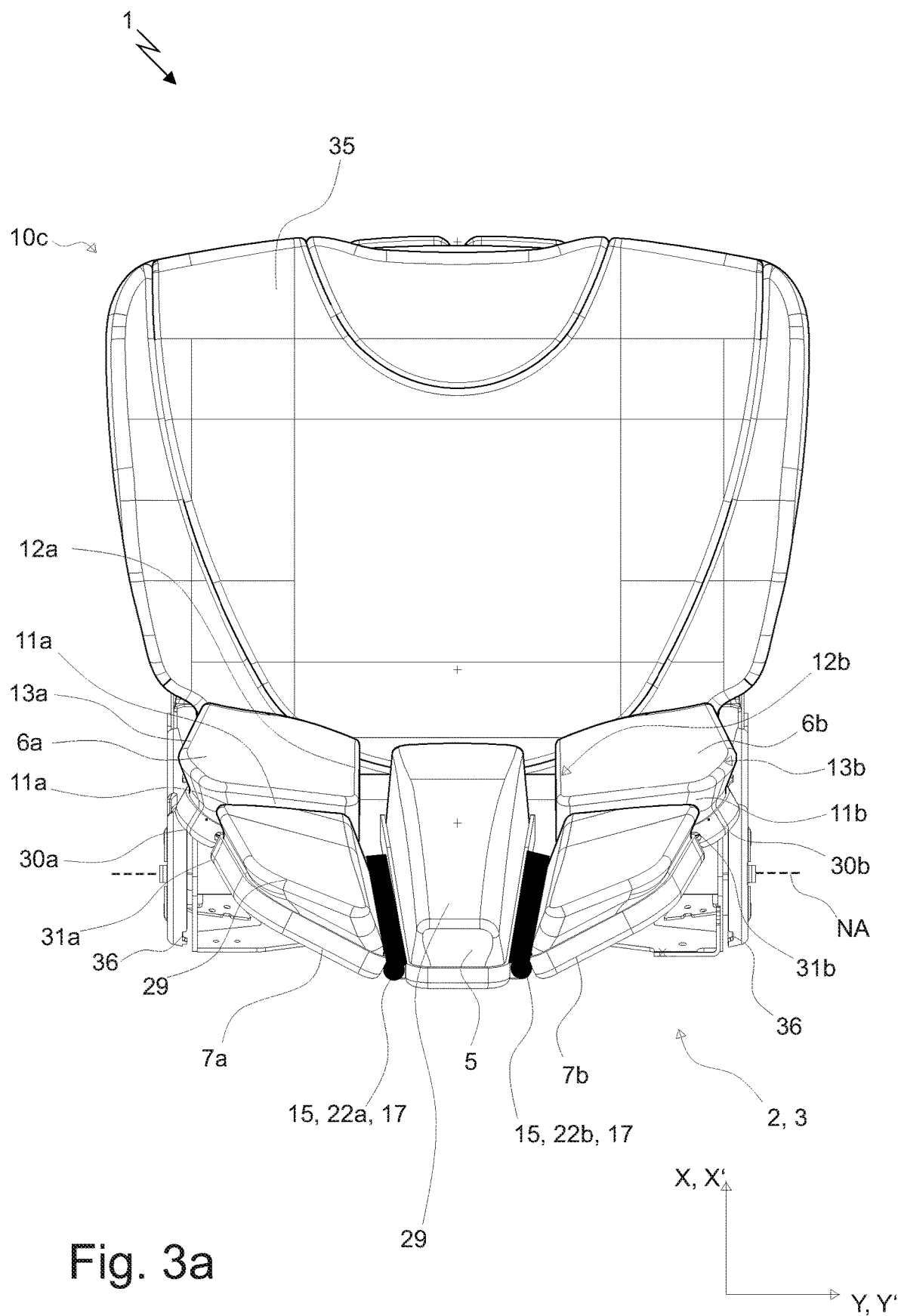
FIG. 3a, 3b, 3c are top views of a vehicle seat according to an embodiment in a initial position of a pivoting to the left and a pivoting to the right.
Figure 3B:
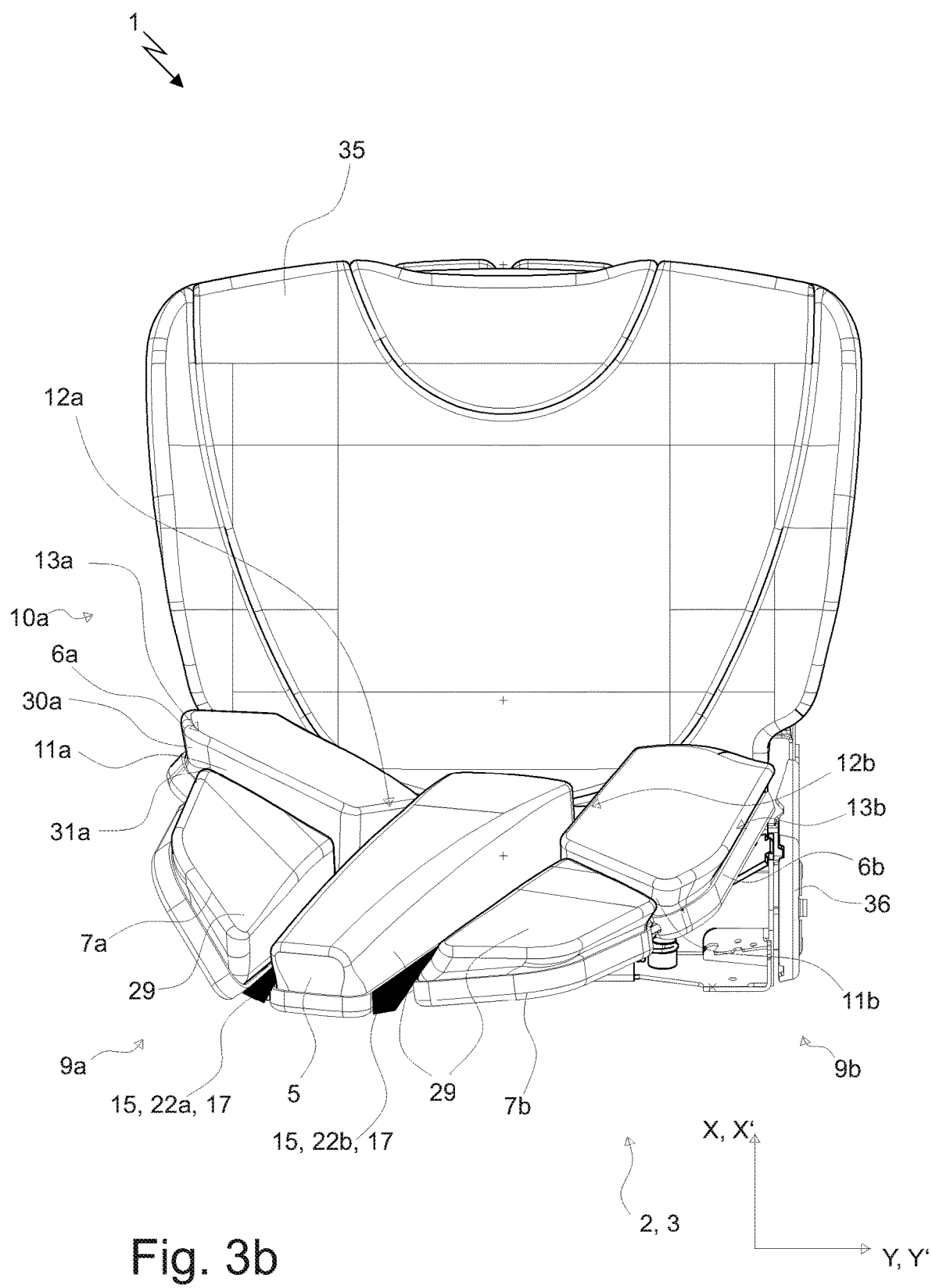
Figure 3C:
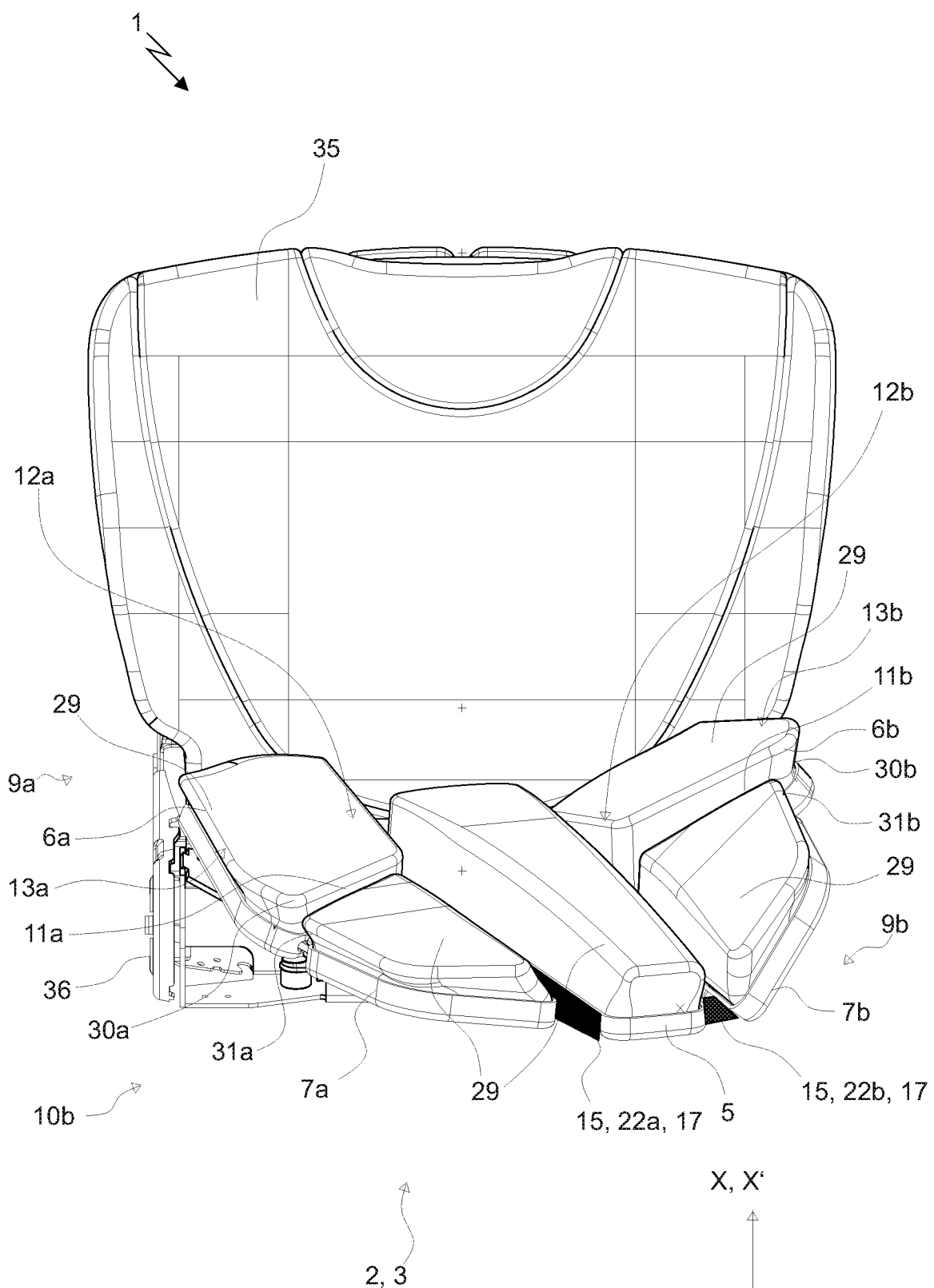
Figure 4A:
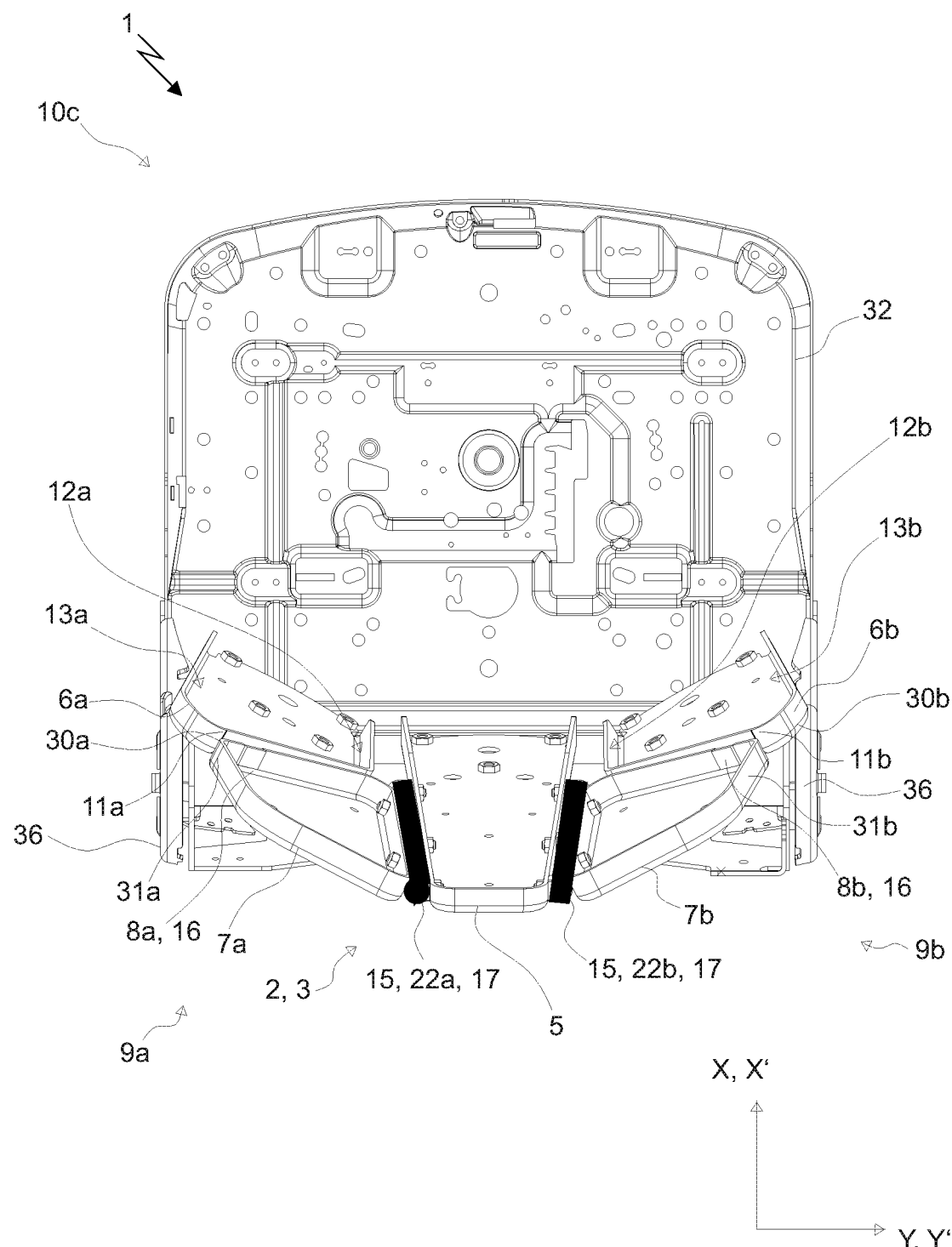
FIG. 4a, 4b, 4c are top views of a vehicle seat according to an embodiment without upholstery elements in a initial position of a pivoting to the left and a pivoting to the right.
Figure 4B:
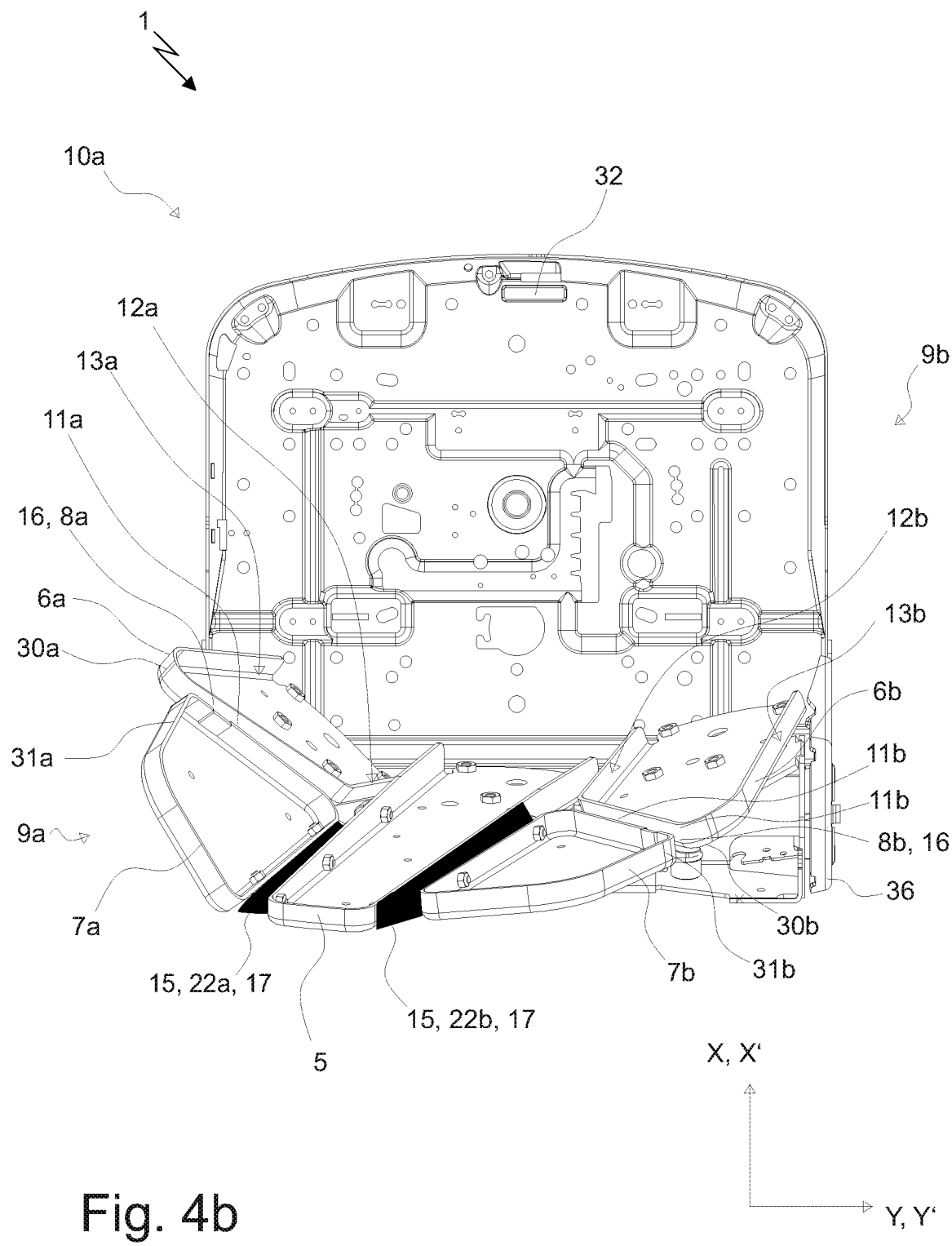
Figure 4C:
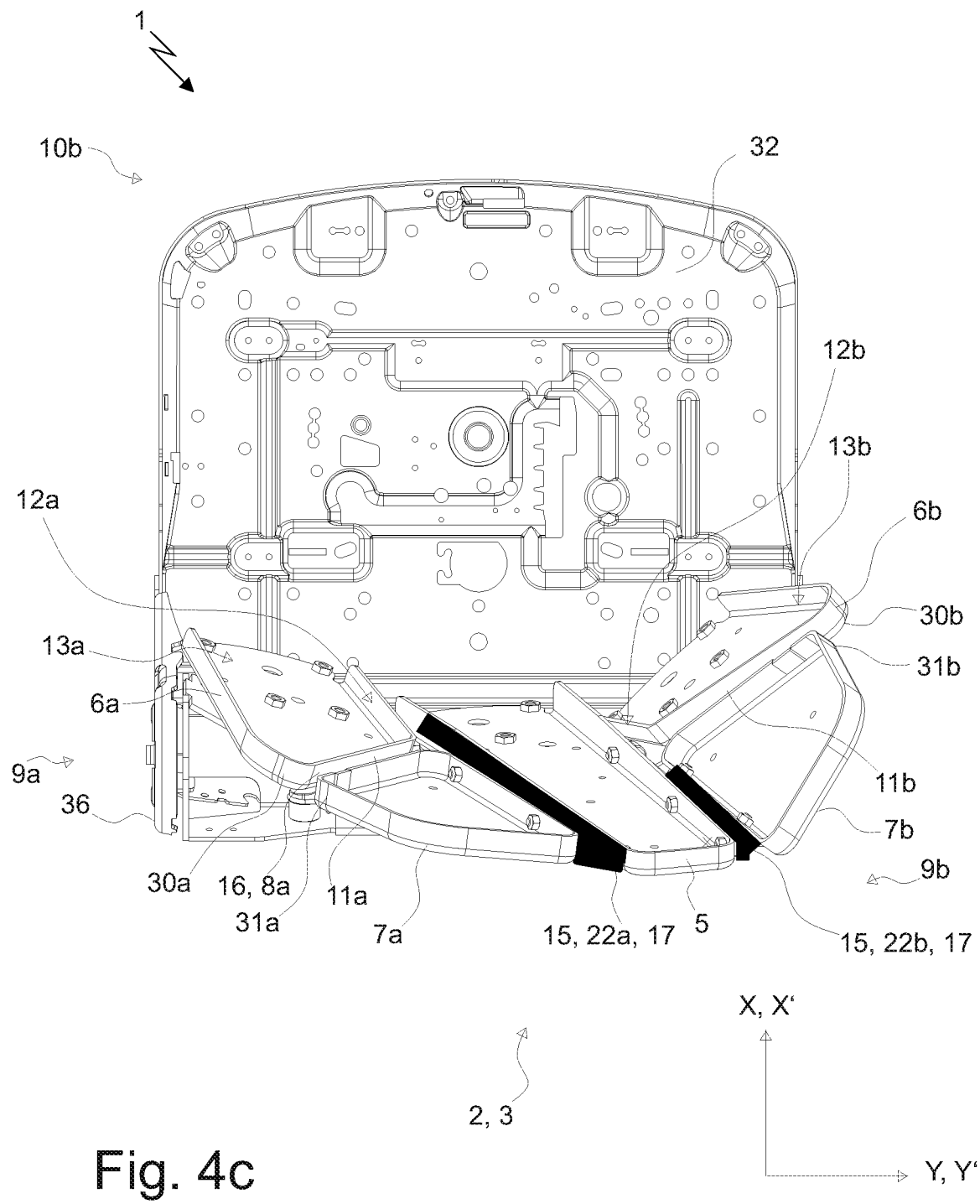
Figure 5A:
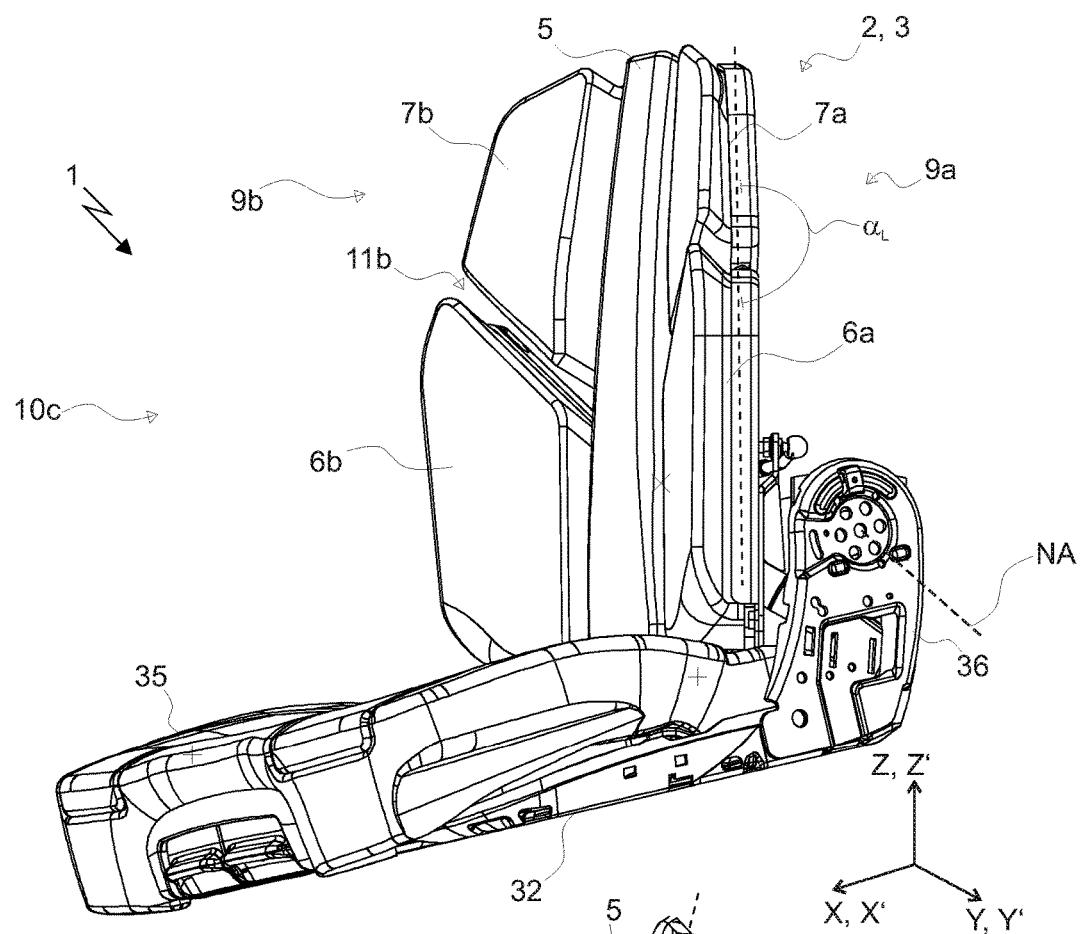
FIG. 5a, 5b, 5c are isometric views of a vehicle seat according to an embodiment in a initial position of a pivoting to the left and a pivoting to the right.
Figure 5B:
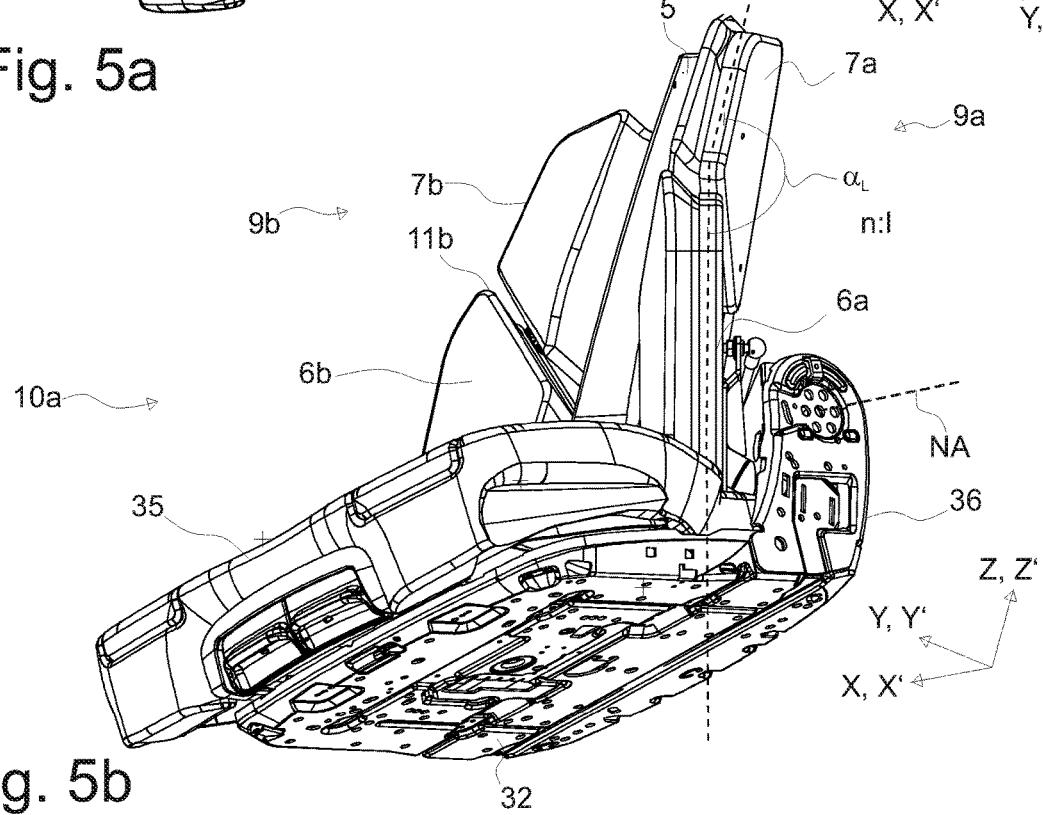
Figure 5C:
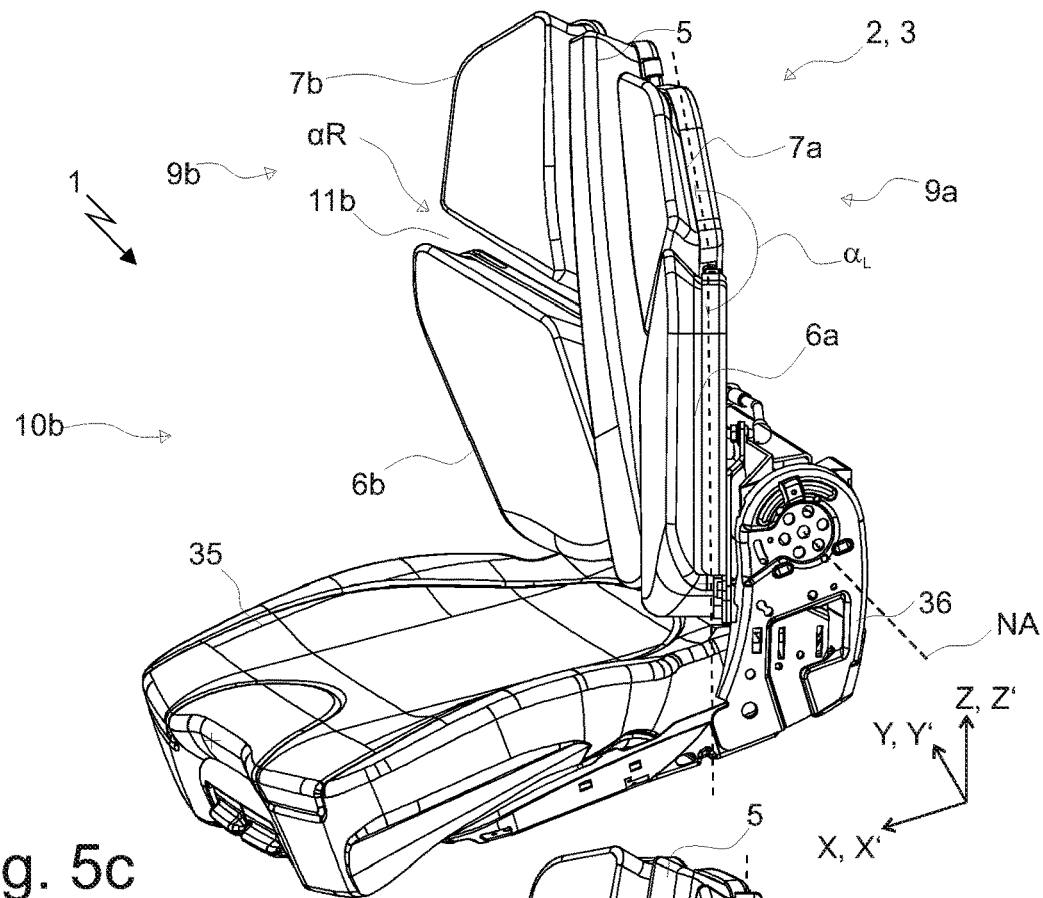
Figure 6A:
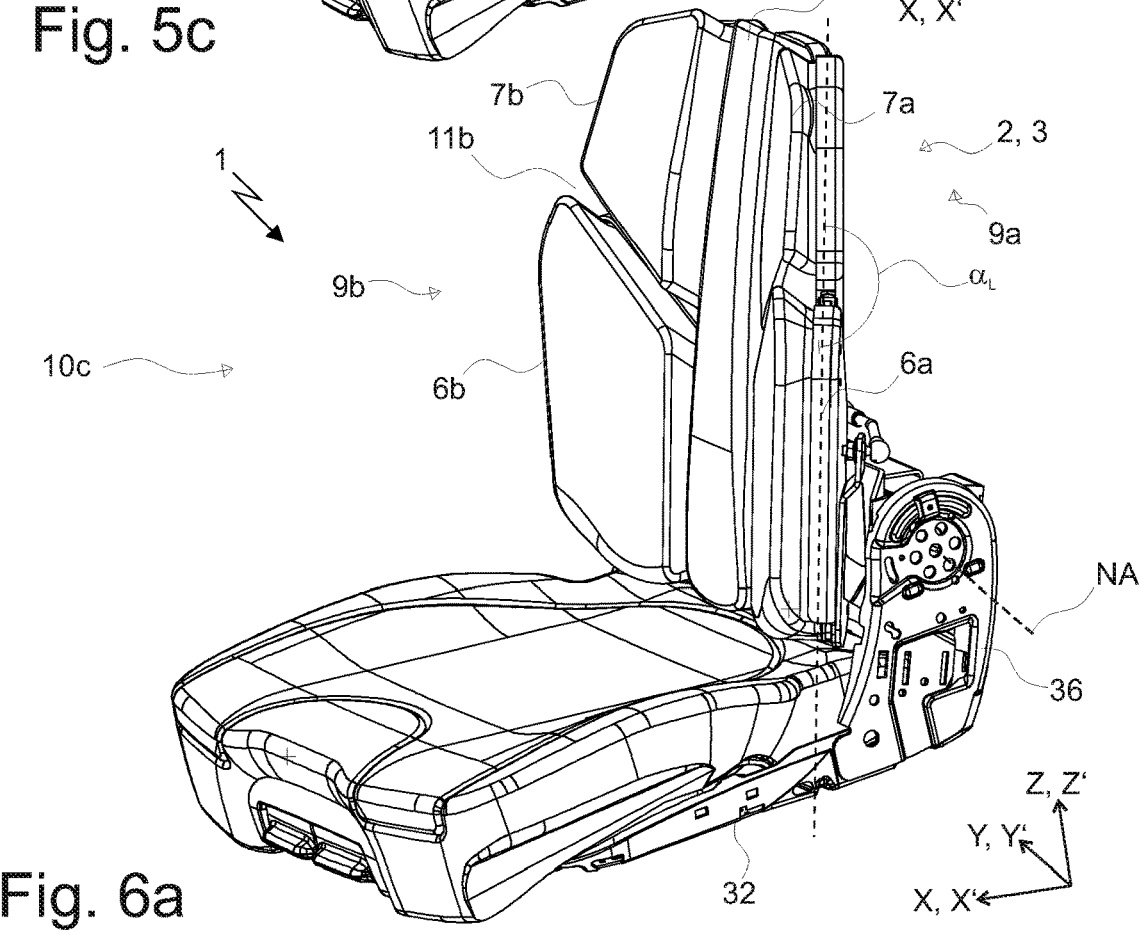
FIG. 6a, 6b, 6c are isometric views of a vehicle seat according to an embodiment in a initial position of a pivoting to the left and a pivoting to the right.
Figure 6B:
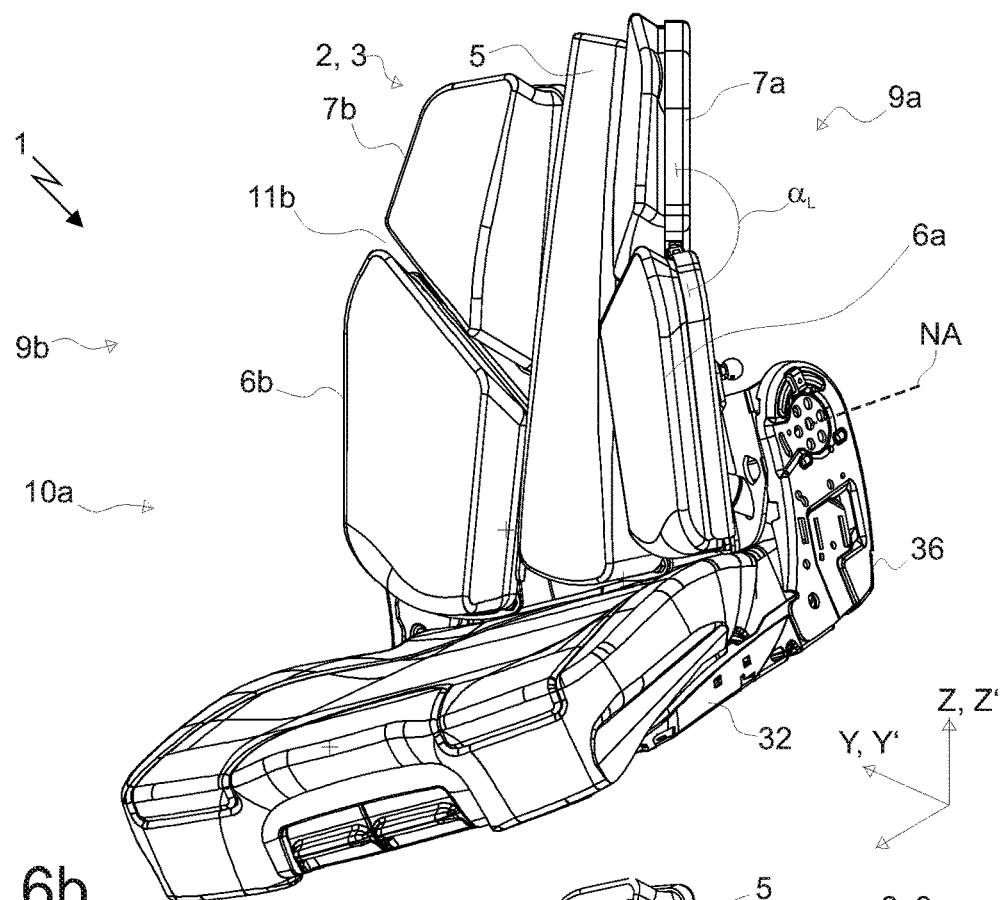
Figure 6C:
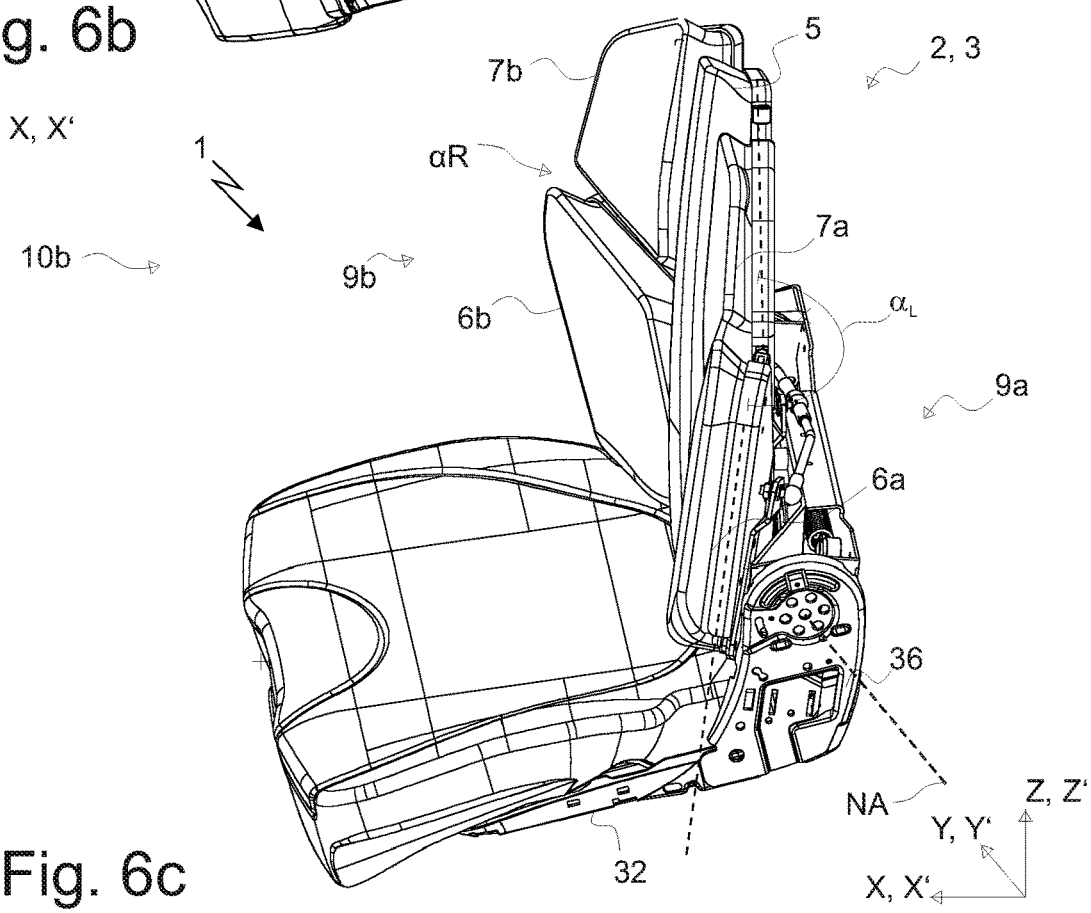

In the outer regions 13a, 13b of the left side portion 9a and of the right side portion 9b of the backrest part 3, a joint device 8a, 8b is provided, which is arranged at least in portions in the associated slot 11a, 11b. The relevant joint device 8a, 8b comprises at least one first elastic element 16, which is fastened directly or indirectly to one of the lower backrest side elements and to an upper backrest side element. The at least one first elastic element has a vertical extent HE which is substantially the distance 40a, 40b or the slot width. The at least one elastic element 16 can be designed in many ways, for example the elastic elements 16 shown in FIG. 14a, 14b, 15a, 15b can be considered. In FIG. 2b, an embodiment is shown in which a first elastic element 16 is provided. This first elastic element 16 has an elongated portion 41, at the ends of which fixing portions 42 are provided. The elongated portion 41 and the fixing portions 42 can have a circular cross section, a square cross section or another cross section. The fixing portions 42 are larger in width and depth or have a larger diameter than the elongated portion 41. This first elastic element 16 is accordingly designed in the shape of a bone. The fixing portions 42 are either arranged on a fastening element 20 or directly on the upper backrest side elements 7a, 7b and lower backrest side elements 6a, 6b.

When the backrest side elements 7a, 7b move relative to one another, the at least one first elastic element 16 is rotated about its vertical extent HE and is further expanded or compressed. This expansion or stretching takes place substantially along the longitudinal extent of the slot 11a, 11b. The joint device 8a, 8b can advantageously also comprise a plurality of first elastic elements 16 which are arranged along a longitudinal extent of the slot 11a, 11b. The first elastic elements 16 can preferably be arranged over the entire longitudinal extent of the slot 11a, 11b or only along a portion of the longitudinal extent of the slot 11a, 11b.

When the middle backrest element 5 is pivoted, the distance 40a, 40b between a lower backrest side element 6a, 6b and an upper backrest side element 7a, 7b changes at least in the inner region 12a, 12b of a side portion 9a, 9b of the backrest part 3 due to the mechanical couplings and a deflection of the joint device 8a, 8b.

A turning movement of an occupant causes a force to be introduced into the backrest part 2. Depending on the seated posture of the occupant, this introduction of force acts on one, several or all of the at least five backrest elements 5, 6a, 6b, 7a, 7b. Due to the mechanical couplings of the upper backrest side elements 7a, 7b and lower backrest side elements 6a, 6b to the middle backrest element 5, the introduction of force is transmitted to all backrest elements 5, 6a, 6b, 7a, 7b. The introduction of force caused by the rotary movement causes pivoting of the middle backrest element 5 and pivoting of the two lower backrest side elements 6a, 6b relative to the backrest base element 4. The middle backrest element 5 is pivoted in directions parallel to the width axis Y. If the occupant turns to the right in order to look over his right shoulder, the middle backrest element 5 is pivoted to the left. A corresponding introduction of force can take place, for example, via a pushing movement of the occupant's shoulder on a side portion 9a, 9b. Pivoting of the middle backrest element 5 causes pivoting of the lower backrest side elements 6a, 6b about the pivot axes SA2, SA3 due to the forced control of the first coupling mechanism 15. Furthermore, the pivoting of the middle backrest element 5 causes a translation of the upper backrest side elements 7a, 7b along the longitudinal axis LA of the middle backrest element 5 and at the same time a rotation of the upper backrest side elements 7a, 7b about the axes of rotation DA. As a result of these movements and a corresponding deflection of the joint device 8a, 8b, an upper edge region 30a, 30b of the lower backrest side element 6a, 6b and a lower edge region 31a, 31b of the upper backrest side element 7a, 7b move out of the second plane E2 and the third plane E3, respectively. An upper edge region 30a, 30b of the lower backrest side element 6a, 6b and a lower edge region 31a, 31b of the upper backrest side element 7a, 7b move out of the associated plane in the direction towards the occupant when the pivoting in the direction of this backrest side element 6a, 6b, 7a, 7b takes place. An upper edge region 30a, 30b of the lower backrest side element 6a, 6b and a lower edge region 31a, 31b of the upper backrest side element 7a, 7b move out of the associated plane in the direction towards the occupant when the pivoting in the opposite direction to this backrest side element 6a, 6b, 7a, 7b takes place. When the middle backrest element 5 is pivoted towards a side portion 9a, 9b of the backrest part 3, the angle $\alpha_L$, $\alpha_R$ is thus an obtuse angle, i.e. an angle greater than 90° and less than 180°, the angles $\alpha_L$, $\alpha_R$ is substantially 180° in the initial position. When the middle backrest element 5 is pivoted away from a side portion 9a, 9b of the backrest part 3, the angle $\alpha_L$, $\alpha_R$ is thus a reflex angle, i.e. an angle greater than 180°. The angles $\alpha_L$, $\alpha_R$ are advantageously enclosed by the surfaces of the backrest side elements 6a, 6b, 7a, 7b or the plate-like elements of the backrest side elements 6a, 6b, 7a, 7b.

Due to the protrusion of the backrest side elements 6a, 6b, 7a, 7b, a kind of bulged bearing/support surface is created for the occupant, which is formed by the upholstery elements 29 or the backrest side elements 6a, 6b, 7a, 7b themselves. In the case of pivoting to the left, for example, the angle $\alpha_L$ is formed as an obtuse angle, and the angle $\alpha_R$ is formed as a reflex angle. Thus, the left upper and lower backrest side elements 6a, 7a protrude and form a kind of bulge. Such a bulge supports the bent posture of the upper body in a seated turning position. The vehicle seat 1 thus offers an ergonomically optimal adaptation of the backrest part 3 to a turning movement of an occupant. Furthermore, such pivoting or rotation of the backrest part can also serve to isolate transverse accelerations (swaying).

The described movements of the upper and lower backrest side elements 6a, 6b, 7a, 7b result in a deflection of the joint devices 8a, 8b along several degrees of freedom, in particular a rotation and an expansion or compression of the at least one elastic element 16. When the middle backrest element 5 is pivoted, the distance 40a, 40b between a lower backrest side element 6a, 6b and an upper backrest side element 7a, 7b, or the slot width at least in the inner region 12a, 12b of a side portion 9a, 9b of the backrest part 3, changes due to the mechanical couplings and a deflection of the joint device 8a, 8b. In FIG. 7b, 7c, 13b, 13c, for example, it can be clearly seen that the upper edge of the lower backrest side elements 6a, 6b facing the slot 11a, 11b and the lower edge of the upper backrest side elements 7a, 7b facing the slot in the inner region 12a, 12b of a side portion bear against one another in portions. These regions are marked with a circle 43, 48 in each of these drawings.

According to a further embodiment, the middle backrest element 5 is designed in two parts. The middle backrest element 5 accordingly comprises an upper portion 5a and a lower portion 5b. The two portions 5a, 5b of the middle backrest element 5 are connected to one another by a further joint device 44. The further joint device 44 or the division of the middle backrest element 5 is arranged in a lower region of the middle backrest element 5. The further joint device 44 is advantageously arranged in or above the lumbar region of the occupant. Thus, by pivoting of the upper portion 5a relative to the lower portion 5b, a posture adjustment or a lordosis/kyphosis of the occupant can be compensated for. Advantageously, the inclination of the upper portion 5a of the middle backrest element 5 can be adjusted hydraulically, pneumatically or manually by an actuating drive, for example an electric motor.

According to a further embodiment, a locking device 33 is provided, by means of which a rotational position 10a, 10b, 10c of the backrest part 3 can be locked. Furthermore, it would be conceivable that a resetting device is provided, which returns the backrest part 3 to its initial position 10c. On the first fastening element 23, a pin 46 is provided which extends along the longitudinal axis X into the backrest base element 4. A pair of springs 47a, 47b is provided within the backrest base element 4. The pin 46 is arranged between the springs 47a, 47b of the pair of springs and is operatively connected to them or is fastened to one end of each spring 47a, 47b. The other end of the springs is connected to the backrest base element 4. This can be seen clearly in FIG. 10e. By pivoting of the first fastening element 23, the pin 46 is displaced along the width axis Y. One of the springs 47a, 47b is thus compressed and a further spring 47a, 47b is expanded. The corresponding spring forces can bring about a return of the backrest part 3 to the initial position 10c. The displacement of the pin 46 can be locked by the locking device 33, whereby the pivoting of the first fastening element 23 can be locked. The pivoting of the entire backrest part 3 can be locked by the mechanical couplings.

According to a further embodiment, a drive unit 34 is provided, by means of which the backrest part 3 can be brought into a rotational position 10a, 10b, 10c. The drive unit 34 could, for example, drive the displacement of the pin 46 along the width axis Y and thus the pivoting of the first fastening element 23 or the entire backrest part 3. The drive unit 34 can be, for example, an electric actuating drive, a pneumatic, hydraulic or some other drive.

Figure 16:
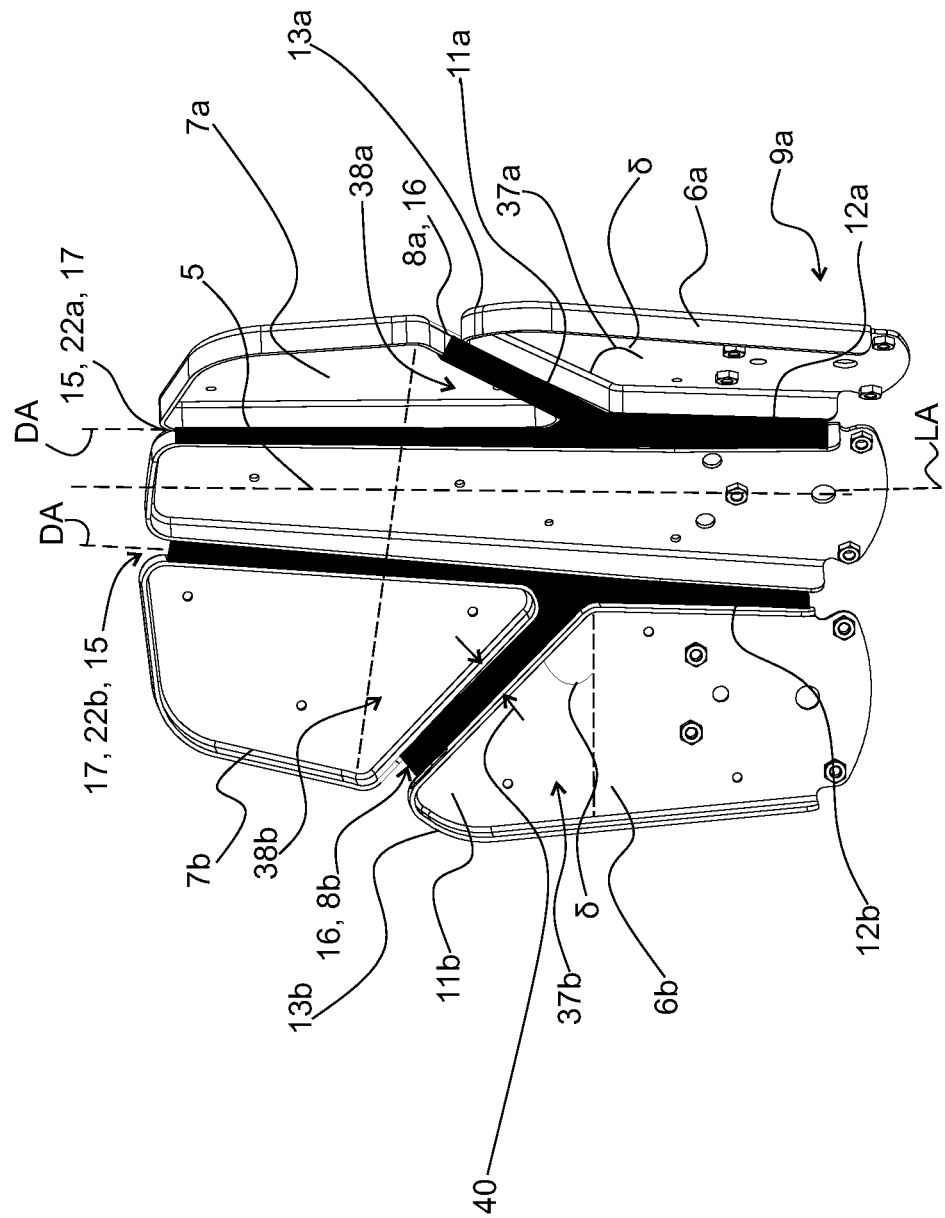
FIG. 16 is a view of the backrest part according to an embodiment.
Figure 17:
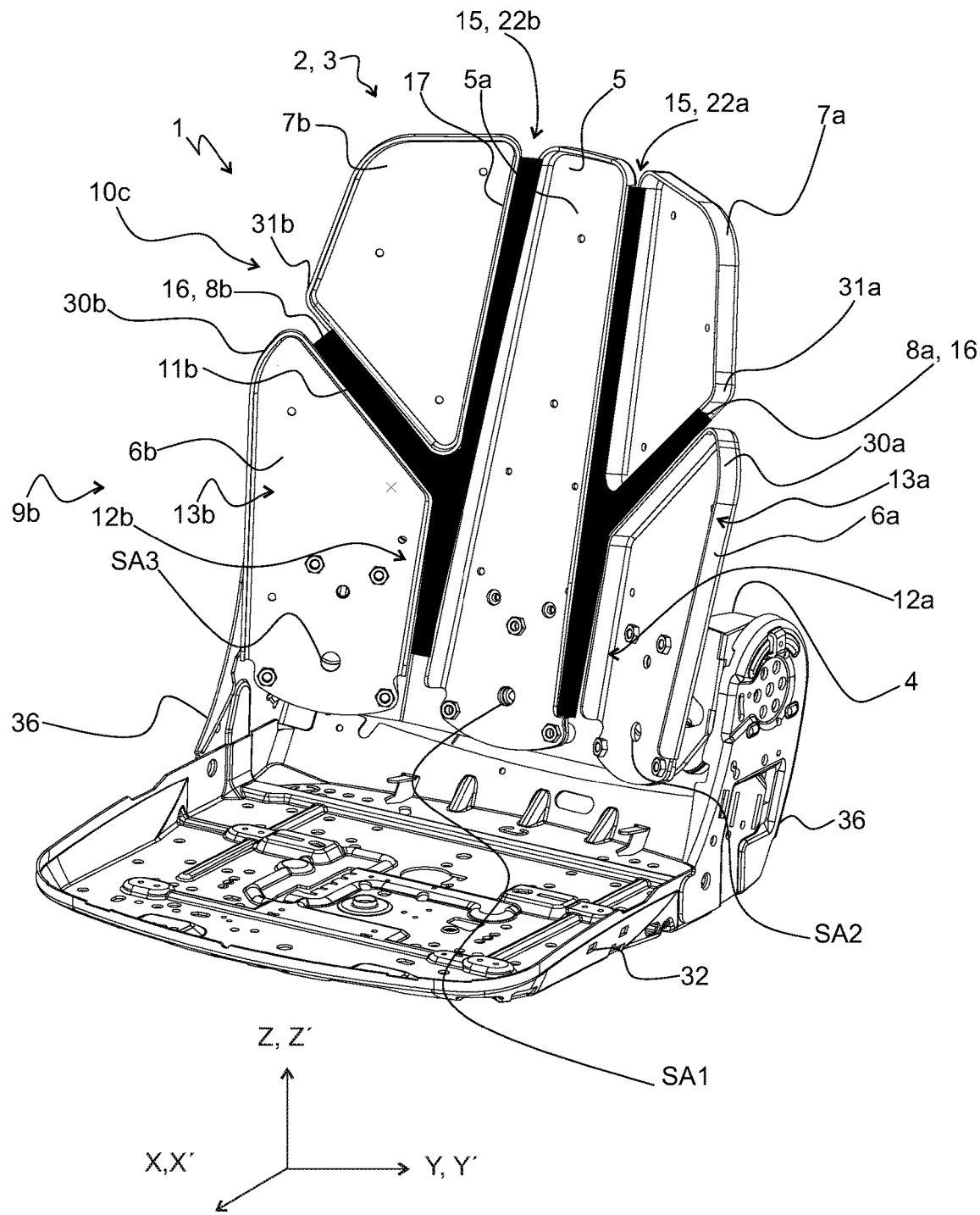
FIG. 17 is a view of the vehicle seat according to an embodiment.

Another possible embodiment is shown in FIGS. 16 and 17, in which a third elastic element 49 is provided. The third elastic element 49 comprises the two first elastic elements 16, the two second elastic elements 17 and, furthermore, connects the lower backrest side elements 6a, 6b and the middle backrest element 5. The third elastic element 49 is thus arranged in each case between an upper backrest side element 7a, 7b and a lower backrest side element 6a, 6b, between each upper backrest side element 7a, 7b and the middle backrest element 5 and between each lower backrest side element 6a, 6b and the middle backrest element 5. The third elastic element 49 is thus an integral or one-piece element which extends continuously between the at least five backrest elements 5, 6a, 6b, 7a, 7b, in particular also in the space 50 in which the slots 11a, 11b open in an intermediate space 51, which extends initially between the middle backrest side element 5 and the lower backrest side elements 6a, 6b and then upwards along the height axis Z between the middle backrest element 5 and the upper backrest side elements 7a, 7b. The distance between the backrest elements 5, 6a, 6b, 7a, 7b in each case is at least partially or substantially completely filled by the third elastic element 49. The third elastic element 49 can be designed according to the embodiments shown in FIG. 14a, 14b, 15a, 15b. However, it can also be designed as a continuous, injected elastic plastics material. Advantageously, a thickness of the third elastic element 49 in the portions of the first 16 and second elastic elements 17, i.e. between the upper backrest side elements 7a, 7b and the lower backrest side elements 6a, 6b and between the upper backrest side elements 7a, 7b and the middle backrest side element 5, is greater than in the portions of the third elastic element 49 which are located between the lower backrest side elements 6a, 6b and the middle backrest side element 5. This is advantageous since greater forces act on the third elastic element 49 in the regions of the first elastic element 16 and second elastic element 17. Advantageously, undercuts are provided on the backrest elements 5, 6a, 6b, 7a, 7b in order to ensure sufficient mechanical load-bearing capacity between the backrest elements 5, 6a, 6b, 7a, 7b and the third elastic element.

The applicant reserves the right to claim all the features disclosed in the application documents as essential to the invention, provided that these are novel, individually or in combination, over the prior art. It is further pointed out that features which in themselves can be advantageous have also been described in the individual drawings. A person skilled in the art will immediately recognize that a particular feature described in one drawing can also be advantageous without adopting further features from this drawing. Furthermore, a person skilled in the art will recognize that advantages can also result from a combination of a plurality of features shown in individual or in different drawings.

LIST OF REFERENCE SIGNS 1 vehicle seat
2 backrest
3 backrest part
4 backrest base element
4a left side region of the backrest base element
4b right side region of the backrest base element
4c middle region of the backrest base element
5 middle backrest element
5a upper portion of the middle backrest element
5b lower portion of the middle element
6a left lower backrest side element
6b right lower backrest side element
7a left upper backrest side element
7b right upper backrest side element
8a joint device
8b joint device
9a left side portion
9b right side portion
10a second rotational position of the backrest
10b third rotational position of the backrest
10c first rotational position (initial position) of the backrest
11a slot
11b slot
12a inner region of the left side portion
12b inner region of the right side portion
13a outer region of the left side portion
13b outer region of the right side portion
14 first coupling mechanism
15 second coupling mechanism
16 first elastic element
17 second elastic element
18 base body
18a upper side of the base body
18b lower side of the base body
19 recesses
20 fastening elements
22a coupling device on the left
22b coupling device on the right
23 first fastening element
24 second fastening element
25 third fastening element
26 first coupling rod
27 second coupling rod
28 ball joint
29 upholstery elements
30a upper edge region of the lower backrest side element
30b upper edge region of the lower backrest side element
31a lower edge region of the upper backrest side element
31b lower edge region of the upper backrest side element
32 seat base element
33 locking device
34 drive unit
35 seat part
36 support elements
37a, 37b upper region of the lower backrest side elements
38a, 38b lower region of the upper backrest side elements
39 horizontal axis
40a, 40b distance
41 elongated portion
42 fixing portions
43 region
44 further joint device
45 resetting device
46 pin
47a, 47b springs
48 region
49 third elastic element
50 space
A1 first axis
A2 second axis
DA axis of rotation
E1 first plane
E2 second side plane
E3 third side plane
H height axis
HE vertical extent
LE longitudinal extent of the elastic element
LK longitudinal axis LA longitudinal axis of the middle backrest element
SA1 first pivot axis
SA2 second pivot axis
SA3 third pivot axis
NA axis of inclination
$\alpha_L$ angle on the left
$\alpha_R$ angle on the right
$\beta_1$ first angle of inclination
$\beta_2$ second angle of inclination
$\gamma_2$ angle between pivot axis SA2 and plane
$\gamma^3$ angle between pivot axis SA3 and plane
$\delta$ angle of the slot with the horizontal axis
X depth axis
Y width axis
Z height axis

What is claimed is:

1. A vehicle seat comprising:
a backrest comprising:
a backrest part having a middle backrest element; and
a backrest base element, the backrest part arranged pivotably on the backrest base element,
wherein the backrest part comprises two lower backrest side elements and two upper backrest side elements, which are each mechanically coupled to the middle backrest element,
wherein the two lower backrest side elements are arranged pivotably on the backrest base element,
wherein at least one joint device is provided between one of the lower backrest side elements and one of the upper backrest side elements,
wherein one of the lower backrest side elements and one of the upper backrest side elements are arranged at an angle to one another, and
wherein pivoting of the middle backrest element causes a change in the angle, wherein the at least one joint device comprises at least one elastic element.

2. The vehicle seat according to claim 1,
wherein a first one of the lower backrest side elements and a first one of the upper backrest side elements are arranged on a left side of the middle backrest element and form a left side portion of the backrest part,
wherein a second one of the lower backrest side elements and a second one of the upper backrest side elements are arranged on a right side of the middle backrest element and form a right side portion of the backrest part,
wherein in an initial position of the backrest the middle backrest element is arranged substantially in a first plane which is spanned by a height axis of the backrest and a width axis of the backrest,
wherein in the initial position of the backrest the left side portion of the backrest part is arranged substantially in a second side plane which is spanned by the height axis of the backrest and a first axis,
wherein in the initial position of the backrest the right side portion of the backrest part is arranged substantially in a third side plane which is defined by the height axis of the backrest and a second axis,
wherein the width axis and the first axis enclose a first angle of inclination, and
wherein the width axis and second axis enclose an angle of inclination.

3. The vehicle seat according to claim 2,
wherein at least in the initial position of the backrest, the upper backrest side elements and the lower backrest side elements are spaced apart from one another,
wherein at least in the initial position of the backrest a slot is formed between the upper backrest side elements and the lower backrest side elements, and
wherein the slot extends from an inner region of at least one of the left side portion or the right side portion of the backrest part obliquely upwards along the height axis to an outer region of at least one of the left side portion or the right side portion of the backrest part.

4. The vehicle seat according to claim 3, further comprising:
a first coupling mechanism configured to mechanically couple the middle backrest element to the two lower backrest side elements; and
a second coupling mechanism configured to mechanically couple the middle backrest element to the two upper backrest side elements,
wherein a force is received by the backrest part by a turning movement of an occupant, and
wherein the force causes the middle backrest element and the two lower backrest side elements to pivot relative to the backrest base element.

5. The vehicle seat according to claim 4,
wherein the at least one joint device is provided in each of the outer regions of the left side portion and of the right side portion of the backrest part,
wherein the at least one joint device is arranged at least in portions in the associated slot, and
wherein when the middle backrest element is pivoted, a distance between one of the lower backrest side elements and one of the upper backrest side elements changes at least in the inner region of at least one of the left side portion or the right side portion of the backrest part due to the mechanical couplings and a deflection of the at least one joint device.

6. The vehicle seat according to claim 5,
wherein the at least one elastic element comprises at least one first elastic element of the at least one elastic element, the at least one first elastic element fastened directly or indirectly to one of the lower backrest side elements and to one of the upper backrest side elements,
wherein the at least one first elastic element has a longitudinal extent, and
wherein when the backrest side elements move relative to one another the at least one first elastic element is rotated about its vertical extent and is expanded or compressed.

7. The vehicle seat according to claim 6,
wherein the second coupling mechanism comprises a coupling device configured to arrange one of the upper backrest side elements on the middle backrest element,
wherein the coupling device comprises at least one second elastic element of the at least one elastic element, which is arranged between the one of the upper backrest side elements and the middle backrest element,
wherein the coupling device enables a translational movement of the one of the upper backrest side elements relative to the middle backrest element along a longitudinal axis of the middle backrest element, and
wherein the coupling device enables a rotary movement of the one of the upper backrest side elements relative to the middle backrest element about an axis of rotation which runs parallel to the longitudinal axis of the middle backrest element.

8. The vehicle seat according to claim 2,
wherein the backrest base element has a middle region which extends substantially parallel to the first plane, wherein the backrest base element has two side regions,
wherein a left side region of the backrest base element extends substantially parallel to the second side plane, and
wherein a right side region of the backrest base element extends substantially parallel to the third side plane.

9. The vehicle seat according to claim 8, further comprising:
a second fastening element connected to a first one of the lower backrest side elements arranged on the left and which is pivotable about a second pivot axis; and
a third fastening device connected to a second one of the lower backrest side elements arranged on the right side and which is pivotable about a third pivot axis,
wherein the lower backrest side elements are each arranged on the side regions of the backrest base element so as to be pivotable about the second pivot axis or the third pivot axis, and
wherein the second pivot axis and the third pivot axis extend obliquely upwards along a longitudinal axis and the height axis.

10. The vehicle seat according to claim 4,
wherein the first coupling mechanism transmits a pivoting movement of a first fastening element to a second fastening element and a third fastening element and vice versa,
wherein the first coupling mechanism has a first coupling rod which connects the first fastening element and the second fastening element, and
wherein the first coupling mechanism has a second coupling rod which connects the first fastening element and the third fastening element.

11. The vehicle seat according to claim 1,
wherein the upper backrest side elements and the lower backrest side elements are designed as plate-like elements, and
wherein the plate-like elements are designed to accommodate upholstery elements.

12. The vehicle seat according to claim 1,
wherein when the middle backrest element is pivoted towards a side portion of the backrest part the angle is an obtuse angle, and
wherein when the middle backrest element is pivoted towards a side portion of the backrest part an upper edge region of one of the lower backrest side elements and a lower edge region of one of the upper backrest side elements are displaced forwards at least in an outer edge region of the side portion along a longitudinal axis.

13. The vehicle seat according to claim 1,
wherein the middle backrest element is designed in two parts, and
wherein an upper portion of the middle backrest element is pivotable relative to the lower portion along a longitudinal axis.

14. The vehicle seat according to claim 1, further comprising:
a locking device configured to lock a rotational position of the backrest part; and
a resetting device is configured to return the backrest part to an initial position.

15. The vehicle seat according to claim 1, further comprising a drive unit configured to move the backrest part into a rotational position.

* * * * *